US008953953B2

(12) United States Patent
Abe et al.

(10) Patent No.: US 8,953,953 B2
(45) Date of Patent: Feb. 10, 2015

(54) COHERENT OPTICAL RECEIVER, APPARATUS AND METHOD FOR DETECTING INTER-CHANNEL SKEW IN COHERENT OPTICAL RECEIVER

(71) Applicants: Junichi Abe, Tokyo (JP); Wakako Yasuda, Tokyo (JP); Kiyoshi Fukuchi, Tokyo (JP)

(72) Inventors: Junichi Abe, Tokyo (JP); Wakako Yasuda, Tokyo (JP); Kiyoshi Fukuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/082,875

(22) Filed: Nov. 18, 2013

(65) Prior Publication Data

US 2014/0140690 A1 May 22, 2014

Related U.S. Application Data

(62) Division of application No. 13/505,199, filed as application No. PCT/JP2011/070541 on Sep. 2, 2011, now Pat. No. 8,626,000.

(30) Foreign Application Priority Data

Feb. 1, 2011 (JP) .................. 2011-019612

(51) Int. Cl.
*H04B 10/00* (2013.01)
*H04B 10/61* (2013.01)
*H04B 10/077* (2013.01)

(52) U.S. Cl.
CPC .......... *H04B 10/6164* (2013.01); *H04B 10/616* (2013.01); *H04B 10/6165* (2013.01); *H04B 10/0775* (2013.01)
USPC ...................................... 398/208

(58) Field of Classification Search
USPC .......................... 398/203, 204, 208
See application file for complete search history.

(56) References Cited

U.S. PATENT DOCUMENTS

2010/0209121 A1* 8/2010 Tanimura ............... 398/202
2011/0002689 A1* 1/2011 Sano et al. ............. 398/44

(Continued)

FOREIGN PATENT DOCUMENTS

| JP | 2010-028470 A | 2/2010 |
| JP | 2010-226254 A | 10/2010 |
| JP | 2011-199687 A | 10/2011 |

OTHER PUBLICATIONS

Taylor, M. G., "Coherent Detection Method Using DSP for Demodulation of Signal and Subsequent Equalization of Propagation Impairments", Photonics Technology Letters, IEEE, 2004, pp. 674-676, vol. 16, Issue 2.

*Primary Examiner* — Danny Leung
(74) *Attorney, Agent, or Firm* — Sughrue Mion, PLLC

(57) ABSTRACT

In a coherent optical receiver, sufficient demodulation becomes impossible and consequently receiving performance deteriorates if an inter-channel skew arises, therefore, a method for detecting inter-channel skew in a coherent optical receiver according to an exemplary aspect of the invention includes the steps of: outputting a plurality of optical signals separated into a plurality of signal components by making a test light from a test light source interfere with a local light from a local light source; detecting the optical signals and outputting detected electrical signals; quantizing the detected electrical signals and outputting quantized signals; performing a fast Fourier transform process on the quantized signals; and calculating a difference in propagation delay between the plurality of signal components on the basis of a plurality of peak values in the results of performing the fast Fourier transform process.

3 Claims, 17 Drawing Sheets

(56) References Cited

U.S. PATENT DOCUMENTS

2012/0219302 A1* 8/2012 Sun et al. .................. 398/208
2012/0237202 A1* 9/2012 Abe et al. .................... 398/16
2012/0263481 A1* 10/2012 Ip et al. ..................... 398/193
2013/0051790 A1* 2/2013 Yasuda et al. ............... 398/16
2014/0140690 A1* 5/2014 Abe et al. ................... 398/16

* cited by examiner

… (3) and (4) are obtained from port $I_X$ and port $Q_X$ respectively.

$$I_X(t) = \cos(\Delta\omega t) \quad (3)$$

$$Q_X(t) = \sin(\Delta\omega t) \quad (4)$$

COHERENT OPTICAL RECEIVER, APPARATUS AND METHOD FOR DETECTING INTER-CHANNEL SKEW IN COHERENT OPTICAL RECEIVER

REFERENCE TO RELATED APPLICATION

This application is a Divisional of U.S. patent application Ser. No. 13/505,199, filed on Apr. 30, 2012, which is a National Stage of International Application No. PCT/JP2011/070541, filed on Sep. 2, 2011, which claims priority from Japanese Patent Application No. 2011-019612, filed on Feb. 1, 2011, the contents of all of which are incorporated herein by reference in their entirety.

TECHNICAL FIELD

The present invention relates to coherent optical receivers, apparatuses and methods for detecting inter-channel skew in coherent optical receivers and, in particular, to a coherent optical receiver which receives optical polarization multiplexing signals by means of coherent detection and digital signal processing, and to an apparatus and a method for detecting inter-channel skew in the coherent optical receiver.

BACKGROUND ART

The data capacity in the network has been increasing year by year due to the wide spread of the Internet. In the trunk line connecting metropolitan areas, the optical transmission link whose transmission capacity per one channel is 10 Gb/s or 40 Gb/s has already been introduced. On-Off-Keying (OOK) is employed as a modulation scheme in 10 Gb/s transmission. Although the OOK scheme is used also in 40 Gb/s transmission systems, it is unsuitable for long-haul transmission because the transmission characteristics are greatly influenced by the chromatic dispersion due to the narrow optical pulse width of 25 ps. Therefore, a multilevel modulation scheme using phase modulation and a polarization multiplexing scheme have been adopted, and a Dual Polarization Quadrature Phase Shift Keying (DP-QPSK) scheme is mainly employed for 100 Gb/s class transmission systems.

A light signal modulated by using DP-QPSK scheme in a transmitter is received and demodulated by a coherent optical receiver (refer to non patent literature 1, for example). An example of the configuration of a related coherent optical receiver is shown in FIG. 18. The related coherent optical receiver 700 includes a local light source 710, a 90° hybrid circuit (90° HYBRID) 720, optoelectronic converters (O/E) 730, analog to digital converters (ADC) 740, and a digital signal processing unit (DSP) 750.

Signal light and local light can be expressed as single polarization signals by the following formulae respectively.

$$S(t) = \exp[j\omega t] \quad (1)$$

$$L(t) = \exp[j(\omega + \Delta\omega)t] \quad (2)$$

where $\Delta\omega$ represents a frequency offset between the signal light and the local light. The signal light and the local light are inputted to the 90° hybrid circuit (90° HYBRID) 720, and after passing through an optical interference system, they are converted into electrical signals by the optoelectronic converters (O/E) 730 which are made up of a differentially configured set of photodiodes. At that time, outputs expressed by In a case of a polarization multiplexed signal, S(t) is expressed as $S(t) = E_X + E_Y$, and a cosine component of the mixed signal $E_X + E_Y$ is outputted at $I_X$ and $I_Y$ ports and a sine component of the mixed signal $E_X + E_Y$ is outputted at $Q_X$ and $Q_Y$ ports.

The signals outputted from the respective ports are inputted into the digital signal processing unit (DSP) 750, after being AD converted by the analog to digital converters (ADC) 740. In the digital signal processing unit (DSP) 750, $E_X$ and $E_Y$ signals are separated by a polarization demultiplexing process, and then demodulated in 4-levels by a phase estimation process.

In this way, DP-QPSK signals can be demodulated using a coherent optical receiver.

Non Patent Literature 1: M. G. Taylor, "Coherent Detection Method Using DSP for Demodulation of Signal and Subsequent Equalization of Propagation Impairments", IEEE Photonics Technology Letters, vol. 16, No. 2, February 2004, pp 674-676.

DISCLOSURE OF INVENTION

Problem to be Solved by the Invention

The signals expressed in the above-described formulae (3) and (4) are true only if, in the coherent optical receiver 700, all lengths of four signal lines from the outputs of the 90° hybrid circuit 720 to the inputs of the analog to digital converters 740 are equal. However, it is difficult to make precisely equal the length between those four channels, that is, the length of optical fiber cables from the outputs of the 90° hybrid circuit 720 to the inputs of the optoelectronic converters 730, and the length of coaxial wires from the outputs of the optoelectronic converters 730 to the inputs of the analog to digital converters 740.

If the lengths of the lines are not equal between those four channels, there arises a delay in signal transmission, that is, a skew. The influence of the skew will be described referring to FIG. 19. FIG. 19 is a block diagram showing the configuration of related 90° hybrid circuits 720 and their peripherals. In this figure, "PBS" represents a polarization beam splitter, "CPL" a optical coupler, "τ" a 90° phase difference unit, and "BR" represents a balanced photodetector as the optoelectronic converter (O/E) 630, respectively.

If there exists a skew T in the channel 2 (CH2) against the channel 1 (CH1), the above-described formula (4) is changed into the following formula (5).

$$Q_X(t) = \sin(\Delta\omega(t+T)) \quad (5)$$

In the absence of the above-described skew T, polarization demultiplexing and phase estimation can be performed by digital signal processing using the above-described formulae (3) and (4), and demodulation can be achieved perfectly. However, if there exists an inter-channel skew, the output signal from port $Q_X$ expressed by the formula (4) changes into the output signal expressed by the formula (5), and demodulation becomes imperfect even though digital signal processing is performed, and thus sufficient performance can not be achieved. As mentioned above, in a coherent optical receiver, there is a problem that sufficient demodulation becomes impossible and consequently receiving performance deteriorates if an inter-channel skew arises.

The object of the present invention is to provide a coherent optical receiver, and an apparatus and a method for detecting inter-channel skew in the coherent optical receiver which solve the problem mentioned above that in a coherent optical receiver, sufficient demodulation becomes impossible and consequently receiving performance deteriorates if an inter-channel skew arises.

Means for Solving a Problem

A coherent optical receiver according to an exemplary aspect of the invention includes a local light source, a 90° hybrid circuit, an optoelectronic converter, an analog to digital converter, and a digital signal processing unit; wherein the 90° hybrid circuit makes multiplexed signal light interfere with local light from the local light source, and outputs a plurality of optical signals separated into a plurality of signal components; the optoelectronic converter detects the optical signals and outputs detected electrical signals; the analog to digital converter quantizes the detected electrical signals and outputs quantized signals; the digital signal processing unit includes a skew compensation unit for compensating a difference in propagation delay between the plurality of signal components, and an FFT operation unit for performing a fast Fourier transform process on the quantized signals; and wherein the difference in propagation delay is calculated on the basis of a plurality of peak values with a central focus on one peak value in the results of performing the fast Fourier transform process.

An apparatus for detecting inter-channel skew in a coherent optical receiver according to an exemplary aspect of the invention includes a coherent optical receiver, a test light source, an analog to digital converter, an FFT operation unit, and a control block; wherein the coherent optical receiver includes a local light source, a 90° hybrid circuit, and an optoelectronic converter; wherein the 90° hybrid circuit makes multiplexed signal light interfere with local light from the local light source, and outputs a plurality of optical signals separated into a plurality of signal components; the optoelectronic converter detects the optical signals and outputs detected electrical signals; the analog to digital converter quantizes the detected electrical signals and outputs quantized signals; the FFT operation unit performs a fast Fourier transform process on the quantized signals; and the control block calculates a difference in propagation delay between the plurality of signal components on the basis of a plurality of peak values with a central focus on one peak value in the results of performing the fast Fourier transform process.

An optical transmitter/receiver according to an exemplary aspect of the invention includes a coherent optical receiver and an optical transmitter including a phase-modulation light source transmitting a modulated light which is modulated by phase modulation; wherein the coherent optical receiver includes a local light source, a 90° hybrid circuit, an optoelectronic converter, an analog to digital converter, and a digital signal processing unit; wherein the 90° hybrid circuit makes multiplexed signal light interfere with local light from the local light source, and outputs a plurality of optical signals separated into a plurality of signal components; the optoelectronic converter detects the optical signals and outputs detected electrical signals; the analog to digital converter quantizes the detected electrical signals and outputs quantized signals; the digital signal processing unit includes a skew compensation unit for compensating a difference in propagation delay between the plurality of signal components, and an FFT operation unit for performing a fast Fourier transform process on the quantized signals; and wherein the difference in propagation delay is calculated on the basis of a plurality of peak values with a central focus on one peak value in the results of performing the fast Fourier transform process in cases where the modulated light is inputted from the phase-modulation light source into the 90° hybrid circuit and is made to interfere with the local light.

A method for detecting inter-channel skew in a coherent optical receiver according to an exemplary aspect of the invention includes the steps of: outputting a plurality of optical signals separated into a plurality of signal components by making a test light from a test light source interfere with a local light from a local light source; detecting the optical signals and outputting detected electrical signals; quantizing the detected electrical signals and outputting quantized signals; performing a fast Fourier transform process on the quantized signals; and calculating a difference in propagation delay between the plurality of signal components on the basis of a plurality of peak values with a central focus on one peak value in the results of performing the fast Fourier transform process.

Effect of the Invention

According to the coherent optical receiver by the present invention, even if a skew arises between the channels, it becomes possible to achieve sufficient demodulation and thus to suppress deterioration of reception performance.

DESCRIPTION OF EMBODIMENTS

The exemplary embodiments of the present invention will be described with reference to drawings below.

THE FIRST EXEMPLARY EMBODIMENT

Figure 1:
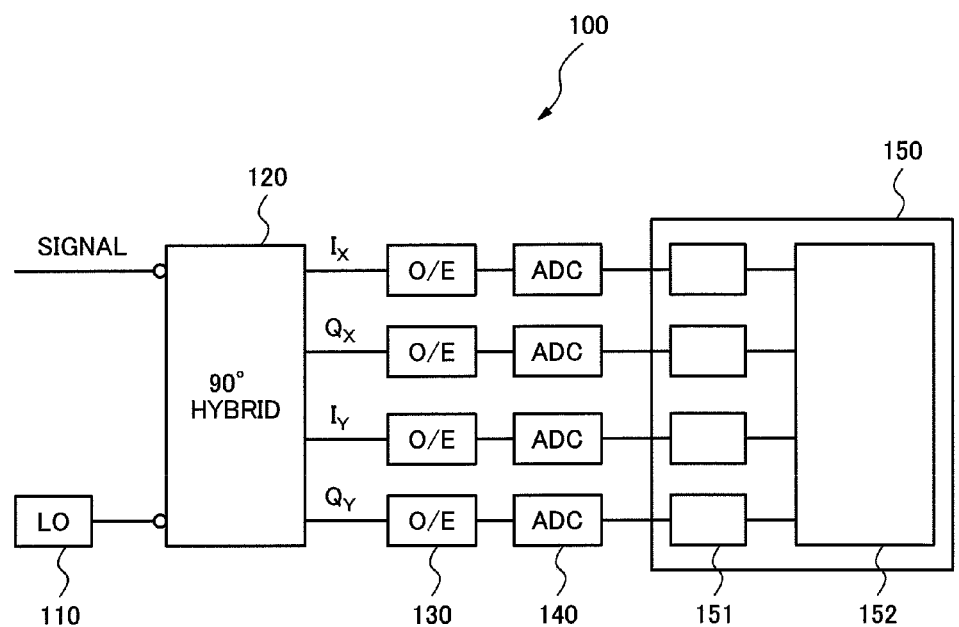
FIG. 1 is a block diagram showing the configuration of a coherent optical receiver in accordance with the first exemplary embodiment of the present invention.

FIG. 1 is a block diagram showing the configuration of a coherent optical receiver 100 in accordance with the first exemplary embodiment of the present invention. The coherent optical receiver 100 has a local light source 110, a 90° hybrid circuit (90° HYBRID) 120, optoelectronic converters (O/E) 130, analog to digital converters (ADC) 140, and a digital signal processing unit (DSP) 150.

The 90° hybrid circuit (90° HYBRID) 120 makes multiplexed signal light (SIGNAL) interfere with the local light from the local light source 110, and outputs a plurality of optical signals separated into respective signal components. In the present exemplary embodiment, the cases will be described in which DP-QPSK modulation scheme is used. Accordingly, the 90° hybrid circuit (90° HYBRID) 120 outputs four-wave light signals including four-channel signal components respectively which are composed of in-phase components ($I_X$, $I_Y$) and quadrature-phase components ($Q_X$, $Q_Y$) for each of two polarizations (X polarization and Y polarization).

The optoelectronic converter (O/E) 130 detects the respective light signals outputted by the 90° hybrid circuit 120, and outputs the detected electrical signals. The analog to digital converter (ADC) 140 quantizes the detected electrical signals, and outputs the quantized signals.

The digital signal processing unit (DSP) 150 is provided with a skew compensation unit 151 which compensates the difference in propagation delay between a plurality of signal components (hereinafter, also referred to as "skew"), and a demodulation unit 152. The skew compensation unit 151 can be configured by using an FIR (Finite Impulse Response) filter, for example; and in such a case, it holds filter coefficients which are determined on the basis of a skew value. The demodulation unit 152 separates quantized signals into X polarization signals and Y polarization signals by the polarization demultiplexing process, and then demodulates each of the four-channel signal components by the phase estimation process.

Figure 2:
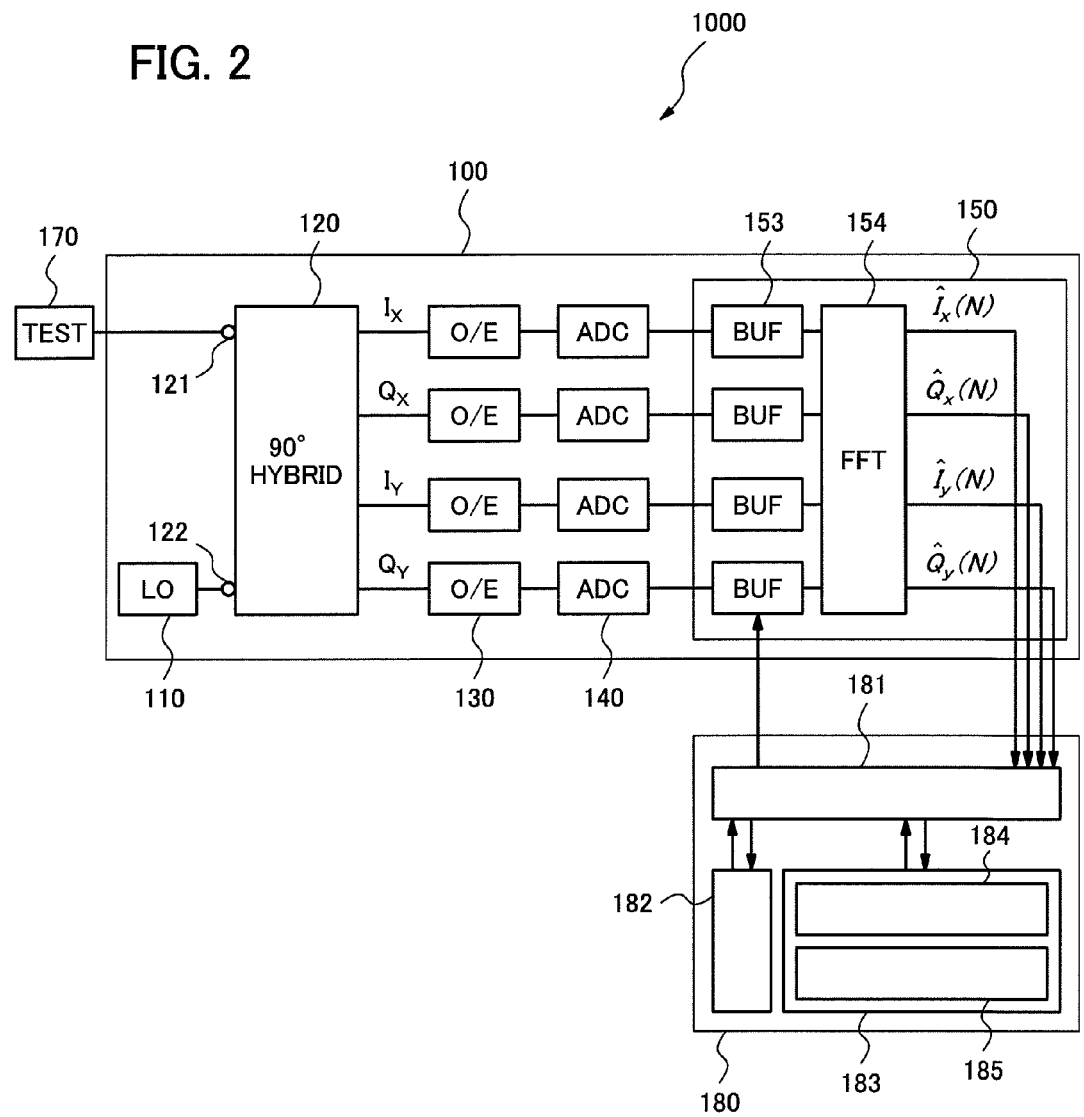
FIG. 2 is a block diagram showing the configuration of an apparatus for detecting inter-channel skew in the coherent optical receiver in accordance with the first exemplary embodiment of the present invention.

Next, a method for detecting inter-channel skew in the coherent optical receiver 100 will be described, referring to FIG. 2. In the following, the case will be described in which the digital signal processing unit (DSP) 150 in the coherent optical receiver 100 is provided with a buffer unit (BUF) 153 and an FFT operation unit (FFT) 154. Here, the FFT operation unit 154 performs a fast Fourier transform (referred to as "FFT", hereinafter) process on the quantized signals outputted by analog to digital converters 140. In FIG. 2, illustrations of the skew compensation unit 151 and the demodulation unit 152 are omitted.

In the following, first, the case will be described in which there is a 90° error between I port and Q port in the 90° hybrid circuit. That is, although there is a delay corresponding to the signal cycle of 90° between I port and Q port in the 90° hybrid circuit, the phase difference does not necessarily correspond to 90° exactly due to the variability in the manufacturing process of the 90° hybrid circuit. Taking into account a delay AT due to the error in the 90° phase difference, the formula (5) described above is changed into the following formula (6).

$$Q_X(t) = \sin(\Delta\omega(t+T) + \Delta T) \tag{6}$$

When there exists this 90° error, the output signal from port $Q_X$ expressed by the formula (4) changes into the output signal expressed by the formula (6), and also in this case, demodulation becomes insufficient even though digital signal processing is performed, and thus sufficient performance can not be achieved.

As shown in FIG. 2, a test light source 170 and a control block 180 are connected to the coherent optical receiver 100, and thereby an apparatus for detecting inter-channel skew in the coherent optical receiver 1000 is configured. The control block 180 includes a control unit 181, a memory unit 182 and an operational processing unit 183. The operational processing unit 183 is provided with a peak detection unit 184 and a skew calculation unit 185, and calculates a skew value from FFT processed results. Here, the peak detection unit 184 and the skew calculation unit 185 can be configured by specific signal processing circuits, and may also be configured by a central processing unit (CPU) and programs for enabling the CPU to execute a process.

The test light source (TEST) 170 is connected to a signal port 121 of the 90° hybrid circuit (90° HYBRID) 120, and the local light source 110 to a local port 122. Light components outputted from the $I_X$, $Q_X$, $I_Y$, and $Q_Y$ ports, which are output ports of the 90° hybrid circuit (90° HYBRID) 120, are inputted into the optoelectronic converters (O/E) 130, respectively.

In detecting inter-channel skew in the coherent optical receiver 100, first, a continuous wave (CW) light as a test light with a frequency $f_S$ (its wavelength is equal to $\lambda_S$) is inputted from the test light source 170 into the signal port 121. Here, a wavelength tunable light source can be used for the test light source 170. On the other hand, a CW light as a local light of a frequency $f_0$ (its wavelength is equal to $\lambda_S$) is inputted from the local light source 110 into the local port 122. The test light of frequency $f_S$ and the local light of frequency $f_0$ interfere in the 90° hybrid circuit 120, and beat signals of a frequency $f_{IF}=|f_S-f_0|$ are outputted. Here, the beat signals outputted from the $I_X$, $Q_X$, $I_Y$, and $Q_Y$ ports are represented by the following formulae from (7) to (10), respectively.

$$I_X = \cos(2\pi F_{IF} t + \phi_{IX}) \quad (7)$$

$$Q_X = \sin(2\pi F_{IF} t + \phi_{QX}) \quad (8)$$

$$I_Y = \cos(2\pi F_{IF} t + \phi_{IY}) \quad (9)$$

$$Q_Y = \cos(2\pi F_{IF} t + \phi_{QX}) \quad (10)$$

These beat signals are converted into electrical signals by the optoelectronic converters (O/E) 130, quantized by the analog to digital converters (ADC) 140, and then inputted into the digital signal processing unit (DSP) 150, respectively. In the digital signal processing unit (DSP) 150, the signals are divided into blocks with respect to each predetermined processing unit (4096 bits, for example) by buffer units 153, and subjected to an FFT process in the FFT operation unit (FFT) 154. As a result, each of matrices $\hat{I}_X(N)$, $\hat{Q}_X(N)$, $\hat{I}_Y(N)$, and $\hat{Q}_Y(N)$ is obtained as each output of the FFT operation unit 154. Here, "N" represents a point number of FFT and it is equal to a value from 0 to 4095, for example.

Next, the method for detecting inter-channel skew in the coherent optical receiver in accordance with the present exemplary embodiment will be described referring to the flowchart shown in FIG. 3. First, a frequency of the test light source 170 is set at a frequency $f_{S1}$ (its wavelength is equal to $\lambda_{S1}$) (step S1). Accordingly, a beat signal of a frequency $f_{IF}=|f_{S1}-f_0|$ is outputted from each output port of the 90° hybrid circuit (90° HYBRID) 120.

Next, data capturing process is started (step S2). At that time, the control unit 181 in the control block 180 transmits a data-capture signal to the digital signal processing unit (DSP) 150 (step S3). The FFT operation unit 154 receives the data-capture signal, triggered by the signal, it performs an FFT process on the data stored in the buffer units (BUF) 153 at that time (step S4), and returns FFT data $\hat{I}_X(N)$, $\hat{Q}_X(N)$, $\hat{I}_Y(N)$, and $\hat{Q}_Y(N)$ to the control unit 181. The control unit 181 stores the acquired FFT data in the memory unit 182 (step S5).

Figure 4:
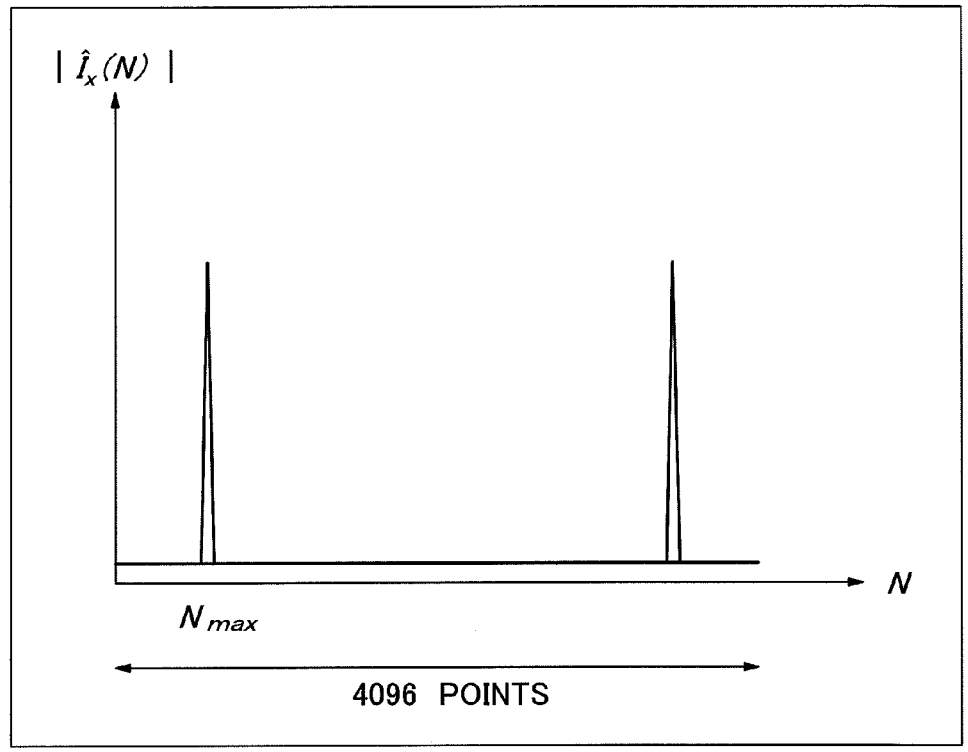
FIG. 4 is a diagrammatic illustration where FFT data are plotted against point number, which are derived by an FFT operation unit in the coherent optical receiver in accordance with the first exemplary embodiment of the present invention.

By an instruction from the control unit 181, the peak detection unit 184 in the operational processing unit 183 extracts the data $\hat{I}_X(N_{max})$ having the maximum magnitude from 4096 points of the FFT data $\hat{I}_X(N)$. The frequency (peak frequency) $f_{max}$ and the phase (peak phase) $\phi_{max}$ at that point are derived by calculation (step S6). In FIG. 4, a diagrammatic illustration is shown where $\hat{I}_X(N)$ are plotted against point number N. Here, since the FFT data $\hat{I}_X(N)$ are composed of complex numbers, the vertical axis of the figure represents the magnitude of $\hat{I}_X(N)$, $|\hat{I}_X(N)|$, and the horizontal axis represents the point number N in the FFT data. As shown in FIG. 4, if $|\hat{I}_X(N)|$ has a peak value at the point number $N_{max}$, the peak detection unit 184 detects the $\hat{I}_X(N_{max})$. Here, $f_T$ representing a sampling frequency in the analog to digital converters (ADC) 140, a frequency interval of the FFT process is equal to $f_T/4096$. Therefore, the peak frequency $f_{max}$ at the peak of $\hat{I}_X(N)$ is equal to $N_{max}f_T/4096$. And then, peak phase information $\phi_{max}=\angle(\hat{I}_X(N_{max}))$ is calculated by using the FFT data $\hat{I}_X(N_{max})$ at the peak frequency $f_{max}$.

In this way, the peak detection unit 184 derives the peak frequency $f_{max}$ and the peak phase $\phi_{max}$ at the peak of the magnitude of the FFT data $\hat{I}_X(N)$, and the control unit 181 stores them in the memory unit 182 as a frequency $f_{IX(1,1)}$ and a phase $\phi_{IX(1,1)}$ (step S7). At that time, the other data of the FFT data $\hat{I}_X(N)$ can be eliminated.

In order to reduce the influence of a measurement error, the processes from step 3 to step 7 are repeated n times, and frequencies $f_{IX(1,n)}$ and phases $\phi_{IX(1,n)}$ are stored in the memory unit 182, respectively (feedback loop FB1). When the n-th loop has completed, an ending flag is set (step 8).

Next, after changing a frequency of the test light source 170 into a frequency $f_{S2}$ (step S9), the processes from step 2 to step 7 are repeated again, and then frequencies $f_{IX(2,n)}$ and phases $\phi_{IX(2,n)}$ are stored in the memory unit 182 (step S7). When detecting an ending flag (step S8), a frequency of the test light source 170 is further swept (step S9), and then the processes from step 2 to step 8 are repeated again (feedback loop FB2). By repeating the feedback loop FB2 m times, frequencies $F_{IX(m,n)}$ and phases $\phi_{IX(m,n)}$ are stored in the memory unit 182, respectively. By performing similar processes for $\hat{Q}_X(N)$, $\hat{I}_Y(N)$ and $\hat{Q}_Y(N)$, frequencies $f_{QX(m,n)}$, $f_{IY(m,n)}$, and $f_{QY(m,n)}$, and phases $\phi_{QX(m,n)}$, $\phi_{IY(m,n)}$, and $\phi_{QY(m,n)}$ are stored in the memory unit 182, respectively.

When the above-mentioned processes have completed, by an instruction from the control unit 181, the skew calculation unit 185 in the operational processing unit 183 calculates skews (step S10). For example, using the $I_X$ port as a reference, a skew in the $I_X$ port becomes zero, and a skew in each of the ports $Q_X$, $I_Y$, and $Q_Y$ is represented by phase lead or phase lag against the $I_X$ port. Specifically, first, the phase differences in the respective ports are obtained for a measurement cycle number n and a measurement frequency m by calculating the following quantities, respectively.

$$\phi_{IX(m,n)}=0$$

$$\phi_{QX(m,n)}-\phi_{IX(m,n)}$$

$$\phi_{IY(m,n)}-\phi_{IX(m,n)}$$

$$\phi_{QY(m,n)}-\phi_{IX(m,n)}$$

Figure 5:
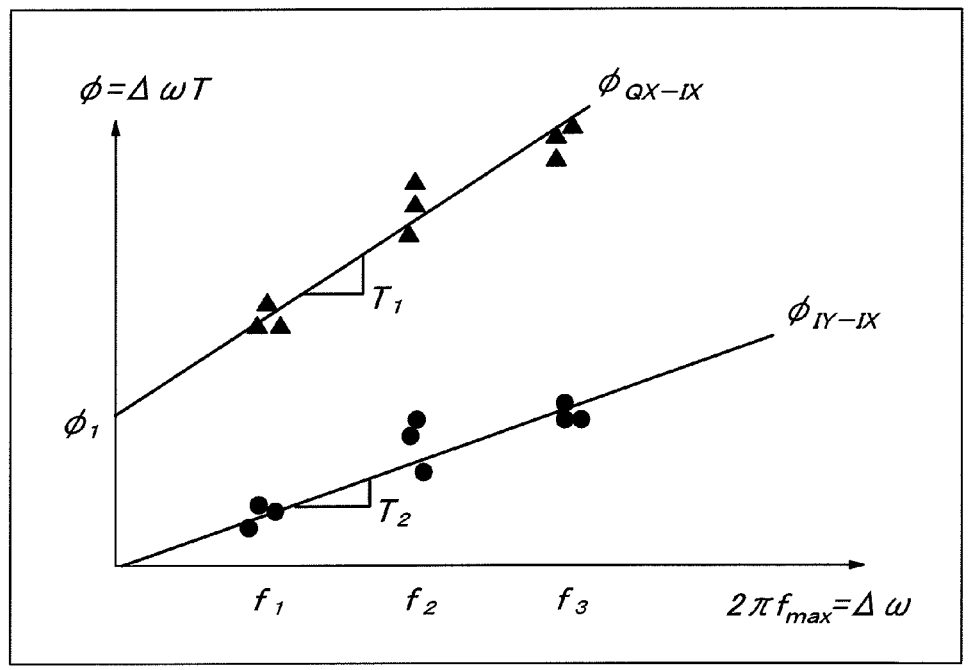
FIG. 5 is a diagrammatic illustration plotting the relations between phase difference and angular frequency at $Q_X$ port and $I_Y$ port of the coherent optical receiver in accordance with the first exemplary embodiment of the present invention.

FIG. 5 shows a diagrammatic illustration plotting the relations between each phase difference of $\phi_{QX-IX}$ and $\phi_{IY-IX}$ in the $Q_X$ port and $I_Y$ port using the $I_Y$ port as a reference and the angular frequency $2\pi f_{max}$. By using this figure, approximation formulae represented by linear functions are derived for the $Q_X$ port and $I_Y$ port respectively, as follows.

$$\phi_{QX-IX}=T_1(2\pi f)+\phi_1$$

$$\phi_{IY-IX}=T_2(2\pi f)+\phi_2$$

An approximation formula is similarly derived for the $Q_Y$ port as follows.

$$\phi_{QY-IX}=T_3(2\pi f)+\phi_3$$

Each gradient of $T_1$, $T_2$, and $T_3$ obtained here represents a skew against the $I_X$ port. Here, the accuracy in the skew detection is obtained by the relation between the point number N of the FFT process and $f_{IF}$. For example, since a period is equal to 1 ns (=1000 ps) with $f_{IF}$ being equal to 1 GHz, the accuracy of the skew detection becomes equal to 0.24 ps (=1000/4096) when N is equal to 4096. That is, it is found that the detection accuracy deteriorates with $f_{IF}$ decreasing.

On the other hand, a phase difference in the $Q_Y$ port against the $I_Y$ port is represented as follows.

$$\phi_{QY(m,n)}-\phi_{IY(m,n)}$$

Here, the relation to the angular frequency $2\pi f_{max}$ is approximately represented by the following linear function, as is the case mentioned above.

$$\phi_{QY-IY}=T_4(2\pi f)+\phi_4$$

Since each of the phase differences $\phi_{QX-IX}$ and $\phi_{QY-IY}$ is equal to $\pi/2$ without frequency offset, each of $\phi_1$ and $\phi_4$ should become $\pi/2$. Therefore, the 90° error between the $I_Y$ port and the $Q_X$ port, and that between the $I_Y$ port and the $Q_Y$ ports become $\phi_1-\pi/2$ and $\phi_4-\pi/2$, respectively. Accordingly, by deriving $\phi_1$ and $\phi_4$ from the y-intercepts of the linear functions shown in FIG. 5, 90° errors in the $I_Y$ port and the $Q_Y$ port are obtained.

As mentioned above, according to the apparatus and the method for detecting inter-channel skew in the coherent optical receiver of this exemplary embodiment, it becomes possible to calculate skews between the output ports and 90° errors between I port and Q port. That is to say, it is possible to input test light into the signal port of the 90° hybrid circuit, observe beat signals between the test light and the local light by means of analog to digital converters, and calculate the skews and the 90° errors by using the phase information obtained by performing an FFT operation. Further, according to the coherent optical receiver 100 of the present exemplary embodiment, by compensating the skew values obtained above in the skew compensation unit 151 of the digital signal processing unit 150, it becomes possible to demodulate sufficiently even though there arises a skew between the channels, and suppress the degradation of receiving performance.

Figure 3:
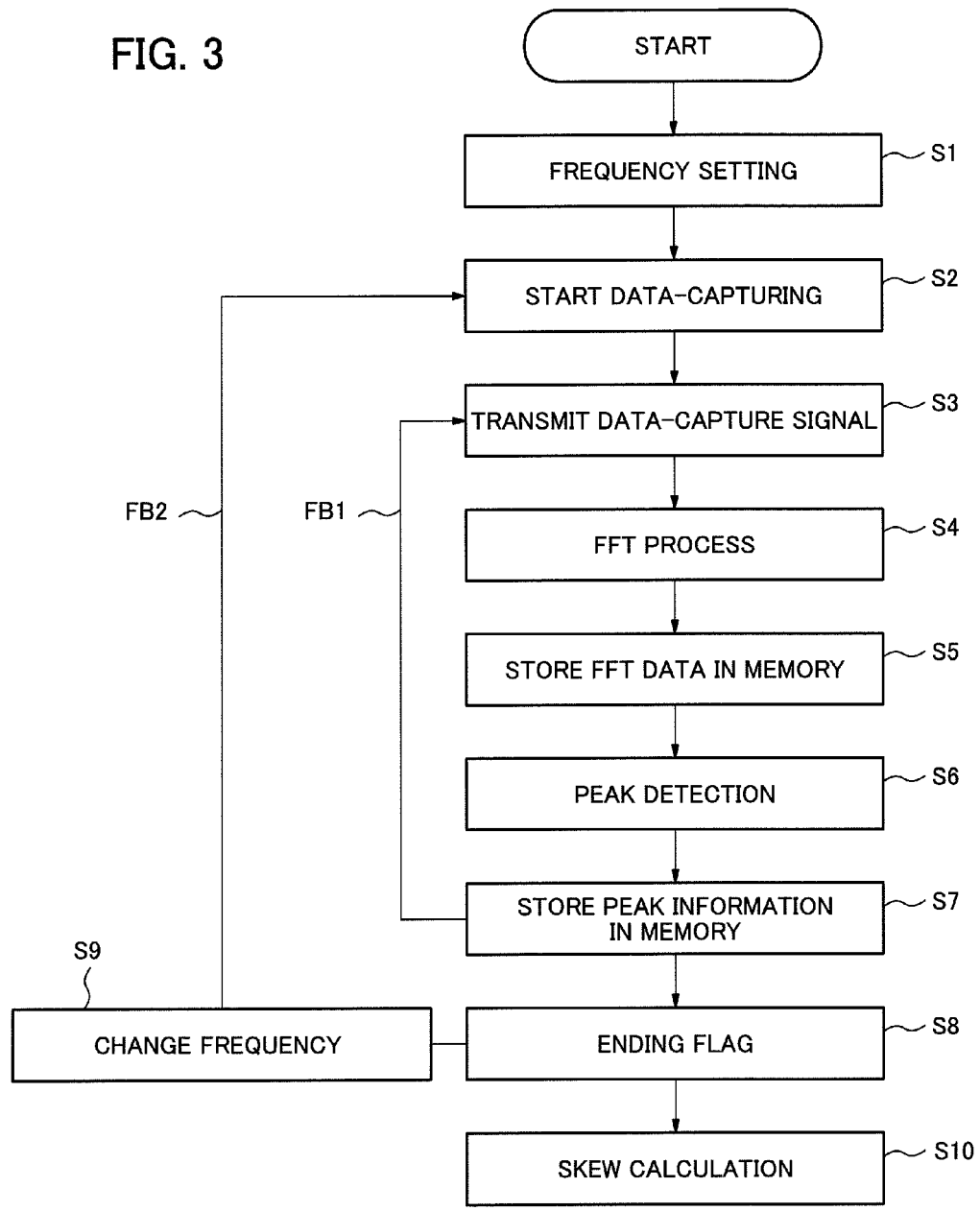
FIG. 3 is a flowchart illustrating a method for detecting inter-channel skew in the coherent optical receiver in accordance with the first exemplary embodiment of the present invention.

In the above-mentioned exemplary embodiment, the 90° error between I port and Q port is calculated by obtaining the difference in peak phase between the channels at each of the frequencies with sweeping the frequency of the test light source as shown by the feedback loop FB2 in FIG. 3. However, if the 90° error can be neglected, it is possible to detect an inter-channel skew more simply.

Figure 6:
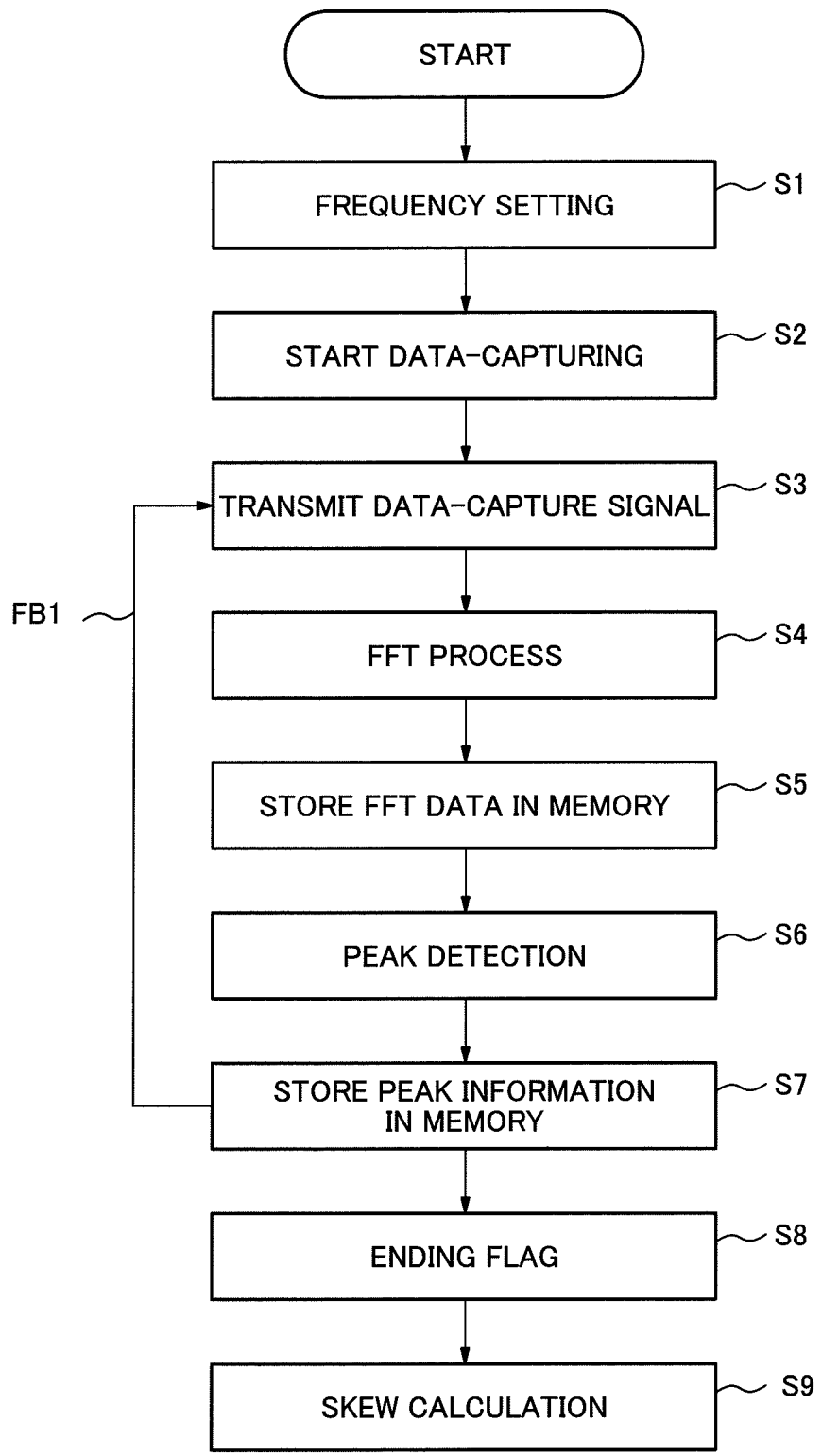
FIG. 6 is a flowchart illustrating another method for detecting inter-channel skew in the coherent optical receiver in accordance with the first exemplary embodiment of the present invention.

FIG. 6 shows a flowchart of the method for detecting inter-channel skew for this case. First, a frequency of the test light source 170 is set at a frequency $f_{S1}$ (its wavelength is equal to $\lambda_{S1}$) (step S1). Accordingly, the beat signal of the frequency $f_{IF}=|f_{S1}-f_0|$ is outputted from each output port of the 90° hybrid circuit (90° HYBRID) 120.

Next, data capturing process is started (step S2). At that time, the control unit 181 in the control block 180 transmits a data-capture signal to the digital signal processing unit (DSP) 150 (step S3). The FFT operation unit 154 receives the data-capture signal, triggered by the signal, it performs an FFT process on the data stored in the buffer units (BUF) 153 at that time (step S4), and returns FFT data $I\hat{}_X(N)$, $Q\hat{}_X(N)$, $I\hat{}_Y(N)$, and $Q\hat{}_Y(N)$ to the control unit 181. The control unit 181 stores the acquired FFT data in the memory unit 182 (step S5).

By an instruction from the control unit 181, the peak detection unit 184 in the operational processing unit 183 extracts the data $I\hat{}_X(N_{max})$ having the maximum magnitude from 4096 points of the FFT data $I\hat{}_X(N)$. The frequency (peak frequency) $f_{max}$ and the phase (peak phase) $\phi_{max}$ at that point are derived by calculation (step S6). The control unit 181 stores this peak frequency and this peak phase in the memory unit 182 as a frequency $f_{IX(1)}$ and a phase $\phi_{IX(1)}$ (step S7).

In order to reduce the influence of a measurement error, the processes from step 3 to step 7 are repeated n times, and frequencies $f_{IX(n)}$ and phases $\phi_{IX(n)}$ are stored in the memory unit 182, respectively (feedback loop FB1). When the n-th loop has completed, an ending flag is set (step 8).

When detecting the end flag, by an instruction from the control unit 181, the skew calculation unit 185 in the operational processing unit 183 calculates skews (step S9). For example, phase differences of the $Q_X$, $I_Y$, and $Q_Y$ ports are obtained using the $I_X$ port as a reference for number of measurements n respectively, as follows.

$$\phi_{IX(n)}=0$$

$$\phi_{QX(n)}-\phi_{IX(n)}$$

$$\phi_{IY(n)}-\phi_{IX(n)}$$

$$\phi_{QY(n)}-\phi_{IX(n)}$$

Figure 7:
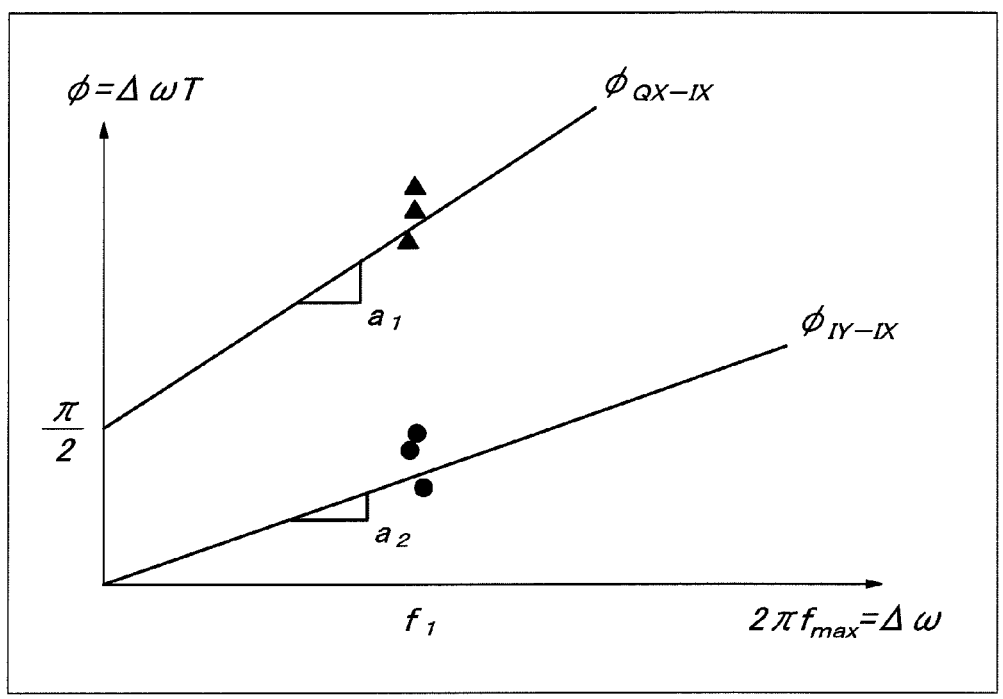
FIG. 7 is a diagrammatic illustration plotting another set of the relations between phase difference and angular frequency at $Q_X$ port and $I_Y$ port of the coherent optical receiver in accordance with the first exemplary embodiment of the present invention.

FIG. 7 shows a diagrammatic illustration plotting the relations between each phase difference of $\phi_{QX-IX}$ and $\phi_{IY-IX}$ in the $Q_X$ port and $I_Y$ port using the $I_X$ port as a reference and the angular frequency $2\pi f_{max}$. Here, if a 90° error between the I port and the Q port can be neglected, approximation formulae represented by linear functions are derived for the $Q_X$ port and $I_Y$ port respectively, as follows.

$$\phi_{QX-IX}=a_1(2\pi f)+\pi/2$$

$$\phi_{IY-IX}=a_2(2\pi f)$$

An approximation formula can be similarly derived for the $Q_Y$ port as follows.

$$\phi_{QY-IX}=a_3(2\pi f)$$

Each gradient of $a_1$, $a_2$, and $a_3$ obtained here represents a skew against the $I_X$ port.

In this way, if a 90° error can be neglected, an inter-channel skew can be detected more simply.

THE SECOND EXEMPLARY EMBODIMENT

Figure 8:
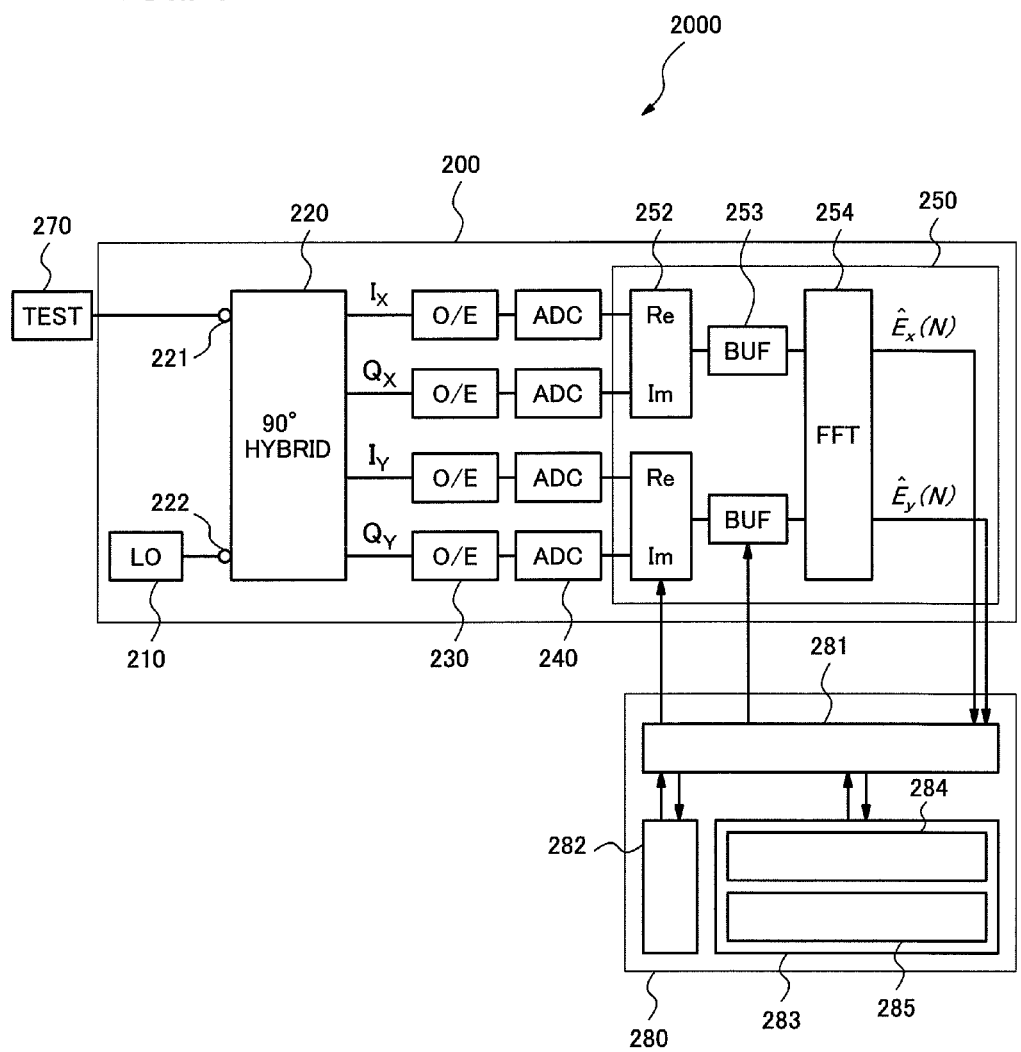
FIG. 8 is a block diagram showing the configuration of an apparatus for detecting inter-channel skew in the coherent optical receiver in accordance with the second exemplary embodiment of the present invention.

Next, the second exemplary embodiment of the present invention will be described. FIG. 8 is a block diagram showing the configuration of an apparatus for detecting inter-channel skew in the coherent optical receiver 2000 in accordance with the second exemplary embodiment of the present invention. The apparatus for detecting inter-channel skew in the coherent optical receiver 2000 has a coherent optical receiver 200, a test light source 270, and a control block 280 connected to the coherent optical receiver 200.

The coherent optical receiver 200 includes a local light source 210, a 90° hybrid circuit (90° HYBRID) 220, optoelectronic converters (O/E) 230, analog to digital converters (ADC) 240, and a digital signal processing unit (DSP) 250. The control block 280 includes a control unit 281, a memory unit 282, and an operational processing unit 283, where the operational processing unit 283 is provided with a peak detection unit 284 and a skew calculation unit 285.

In the coherent optical receiver 200 of the present exemplary embodiment, the configuration of the digital signal processing unit (DSP) 250 is different from that of the digital signal processing unit (DSP) 150 in accordance with the first exemplary embodiment. The digital signal processing unit (DSP) 250 is provided with a complex signal generator 252, buffer units (BUF) 253, and an FFT operation unit (FFT) 254.

The test light source (TEST) 270 is connected to a signal port 221 of the 90° hybrid circuit (90° HYBRID) 220, and the local light source 210 to a local port 222. Light components outputted from the $I_X$, $Q_X$, $I_Y$, and $Q_Y$ ports, which are output ports of the 90° hybrid circuit (90° HYBRID) 220, are inputted into the optoelectronic converters (O/E) 230, respectively. In detecting inter-channel skew in the coherent optical receiver 200, first, a continuous wave (CW) light as a test light of a frequency $f_S$ (its wavelength is equal to $\lambda_S$) is inputted from the test light source 270 into the signal port 221. Here, a wavelength tunable light source can be used for the test light source 270. On the other hand, a CW light as a local light of a frequency $f_0$ (its wavelength is equal to $\lambda_0$) is inputted from the local light source 210 into the local port 222. The test light of frequency $f_S$ and the local light of frequency $f_0$ interfere in the 90° hybrid circuit 220, and beat signals of a frequency $f_{IF}=|f_S-f_0|$ are outputted. Here, the beat signals outputted from the $I_X$, $Q_X$, $I_Y$, and $Q_Y$ ports are represented by the above-mentioned formulae from (7) to (10) as is the case in the first exemplary embodiment.

These beat signals are converted into electrical signals by the optoelectronic converters (O/E) 230, quantized by the analog to digital converters (ADC) 240, and then inputted into the digital signal processing unit (DSP) 250, respectively. In the digital signal processing unit (DSP) 250, the signals from the I port and the Q port are synthesized, and then processed as complex signals. That is, the complex signal generator 252 receives $I_X$ and $Q_X$, and outputs a complex signal of $E_X=I_X+jQ_X$. Similarly, it receives $I_Y$ and $Q_Y$ and outputs a complex signal of $E_Y=I_Y+jQ_Y$.

These complex signals $E_X$ and $E_Y$ are divided into blocks with respect to each predetermined processing unit (4096 bits, for example) by buffer units 253, and subjected to an FFT process in the FFT operation unit (FFT) 254. As a result, each of matrices $\hat{E}_X(N)$ and $\hat{E}_Y(N)$ is obtained as each output of the FFT operation unit 254. Here, "N" represents a point number of FFT and it is equal to a value from 0 to 4095, for example.

In this case, $\hat{E}_X(N)$ is represented by the following formulae.

$$\cos[\Delta\omega(t-T_1)] + j\sin[\Delta\omega(t-T_2)] =$$

$$\frac{1}{2}(e^{j\Delta\omega(t-T_1)} + e^{-j\Delta\omega(t-T_1)}) + \frac{1}{2}(e^{j\Delta\omega(t-T_2)} - e^{-j\Delta\omega(t-T_2)}) =$$

$$\frac{1}{2}\{e^{j\Delta\omega t}(e^{-j\Delta\omega T_1} + e^{-j\Delta\omega T_2}) + e^{-j\Delta\omega t}(e^{j\Delta\omega T_1} - e^{j\Delta\omega T_2})\} =$$

$$\frac{1}{2}\{e^{j\Delta\omega t}P_1 + e^{-j\Delta\omega t}P_2\}$$

where $P_1$, $P_2$, and $\Delta\omega$ are represented by the following formulae.

$$P_1 = e^{-j\Delta\omega T_1} + e^{-j\Delta\omega T_2}$$

$$P_2 = e^{j\Delta\omega T_1} - e^{j\Delta\omega T_2}$$

$$\Delta\omega = 2\pi f_{IF}$$

Next, the method for detecting inter-channel skew in the coherent optical receiver in accordance with the present exemplary embodiment will be described. The flow of its process is similar to that in the first exemplary embodiment, and therefore the following description will be given also referring to the flowchart shown in FIG. 3. First, a frequency of the test light source 270 is set at a frequency $f_{S1}$ (its wavelength is equal to $\lambda_{S1}$) (step S1). Accordingly, a beat signal of a frequency $f_{IF}=|f_{S1}-f_0|$ is outputted from each output port of the 90° hybrid circuit (90° HYBRID) 220.

Next, data capturing process is started (step S2). At that time, the control unit 281 in the control block 280 transmits a data-capture signal to the digital signal processing unit (DSP) 250 (step S3). The FFT operation unit 254 receives the data-capture signal, triggered by the signal, it performs an FFT process on the data stored in the buffer units (BUF) 253 at that time, and returns FFT data $\hat{E}_X(N)$ and $\hat{E}_Y(N)$ to the control unit 281 (step S4). The control unit 281 stores the acquired FFT data in the memory unit 282 (step S5).

Figure 9:
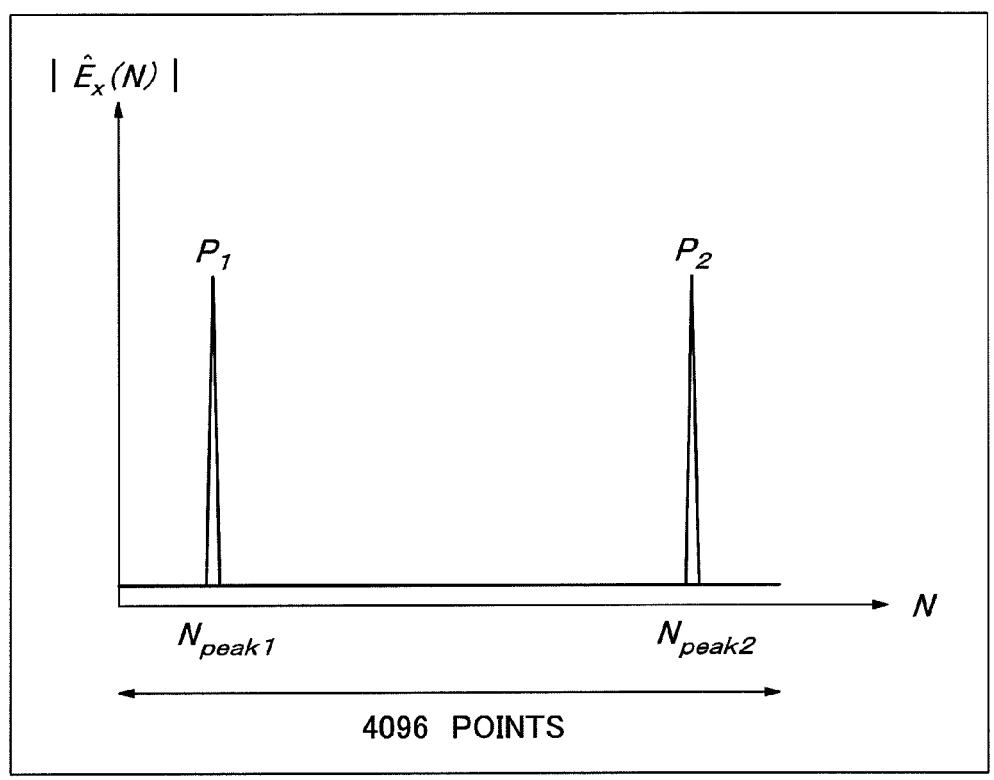
FIG. 9 is a diagrammatic illustration where FFT data are plotted against point number, which are derived by an FFT operation unit in the coherent optical receiver in accordance with the second exemplary embodiment of the present invention.

By an instruction from the control unit 281, the peak detection unit 284 in the operational processing unit 283 extracts two peak values of $P_1=|\hat{E}_X(N_{peak1})|$ and $P_2|\hat{E}_X(N_{peak2})|$ from 4096 points of the FFT data $\hat{E}_X(N)$. And then, the frequencies of $\pm 2\pi f_{IF}$ at that point are derived by calculation (step S6). In FIG. 9, a diagrammatic illustration is shown where $\hat{E}_X(N)$ are plotted against point number N. Here, since the FFT data $\hat{E}_X(N)$ are composed of complex numbers, the vertical axis of the figure represents the magnitude of $\hat{E}_X(N)$, $|\hat{E}_X(N)|$, and the horizontal axis represents the point number N in the FFT data. As shown in FIG. 9, if $|\hat{E}_X(N)|$ has peak values at the point numbers $N_{peak1}$ and $N_{peak2}$, the peak detection unit 284 detects $P_1$ and $P_2$. Here, $f_T$ representing a sampling frequency in the analog to digital converter (ADC) 240, a frequency interval of the FFT process is equal to $f_T/4096$. Therefore, the peak frequencies at the peaks of $\hat{E}_X(N)$ are equal to $f_{peak1}=N_{peak1}f_T/4096$ and $f_{peak2}=-(4096-N_{peak2})f_T/4096$, respectively.

Next, phase information of $\phi_{IX}$ and $\phi_{QX}$ are derived by calculation. First, the peak value $P_1$ is given by the following formula.

$$P_1 = e^{-j\Delta\omega T_1} + e^{-j\Delta\omega T_2}$$

$$= (\cos\Delta\omega T_1 + \cos\Delta\omega T_2) + j(-\sin\Delta\omega T_1 - \sin\Delta\omega T_2)$$

$$= R_1 + jI_1$$

where $R_1$ and $I_2$ are represented by the following formulae.

$$R_1 = \cos\Delta\omega T_1 + \cos\Delta\omega T_2$$

$$I_1 = -\sin\Delta\omega T_1 - \sin\Delta\omega T_2$$

Further, the peak value $P_2$ is given by the following formula.

$$P_2 = e^{j\Delta\omega T_1} - e^{j\Delta\omega T_2}$$

$$= (\cos\Delta\omega T_1 - \cos\Delta\omega T_2) + j(\sin\Delta\omega T_1 - \sin\Delta\omega T_2)$$

$$= R_2 + jI_2$$

where $R_2$ and $I_2$ are represented by the following formulae.

$$R_2 = \cos\Delta\omega T_1 - \cos\Delta\omega T_2$$

$$I_2 = \sin\Delta\omega T_1 - \sin\Delta\omega T_2$$

By those formulae mentioned above, the following relational expressions are obtained.

$$R_1 + R_2 = 2\cos\Delta\omega t_1$$

$$R_1 - R_2 = 2\cos\Delta\omega t_2$$

$$I_1 + I_2 = -2\sin\Delta\omega t_2$$

$$I_1 + I_2 = -2\sin\Delta\omega t_1$$

By solving these relational expressions, the phase information of $\phi_{IX}$ and $\phi_{QX}$ are obtained respectively, as follows.

$$\phi_{IX} = \Delta\omega T_1 = \tan^{-1}\left(\frac{-(I_1 - I_2)}{R_1 + R_2}\right)$$

-continued $$\phi_{QX} = \Delta\omega T_2 = \tan^{-1}\left(\frac{-(I_1 + I_2)}{R_1 - R_2}\right)$$

In this way, the peak detection unit 284 derives the frequency $f_{peak1}$ and the peak phases $\phi_{IX}$ and $\phi_{QX}$ at the peak of the magnitude of the FFT data $E^\wedge_X(N)$, and the control unit 281 stores them in the memory unit 182 as a frequency $f_{X(1,1)}$, and phases $\phi_{IX(1,1)}$ and $\phi_{QX(1,1)}$, respectively (step S7). At that time, the other data of the FFT data $E^\wedge_X(N)$ can be eliminated.

In order to reduce the influence of a measurement error, the processes from step 3 to step 7 are repeated n times, and frequencies $f_{X(1,n)}$, and phases $\phi_{IX(1,n)}$ and $\phi_{QX(1,n)}$ are stored in the memory unit 282, respectively (feedback loop FB1). When the n-th loop has completed, an ending flag is set (step S8).

Next, after changing a frequency of the test light source 270 into a frequency $f_{S2}$ (step S9), the processes from step 2 to step 8 are repeated again, and then frequencies $f_{X(2,n)}$ and phases $\phi_{IX(2,n)}$ and $\phi_{QX(2,n)}$ are stored in the memory unit 282 (step S7). When detecting an ending flag (step S8), a frequency of the test light source 270 is further swept (step S9), and then the processes from step 2 to step 8 are repeated again (feedback loop FB2). By repeating the feedback loop FB2 m times, frequencies $f_{X(m,n)}$ and phases $\phi_{IX(m,n)}$ and $\phi_{QX(m,n)}$ are stored in the memory unit 282, respectively. By performing similar processes for $E^\wedge_y(N)$, frequencies $f_{y(m,n)}$ and phases $\phi_{IY(m,n)}$ and $\phi_{QY(m,n)}$ are stored in the memory unit 282, respectively.

When the above-mentioned processes have completed, by an instruction from the control unit 281, the skew calculation unit 285 in the operational processing unit 283 calculates skews by a similar method to that in the first exemplary embodiment (step 10).

As mentioned above, according to the apparatus and the method for detecting inter-channel skew in the coherent optical receiver of this exemplary embodiment, it becomes possible to calculate skews between the output ports and 90° errors between I port and Q port. Further, by compensating the skew values obtained above in the skew compensation unit of the digital signal processing unit, with which the coherent optical receiver in accordance with the first exemplary embodiment is provided, it becomes possible to demodulate sufficiently even though there arises a skew between the channels, and suppress the degradation of receiving performance.

THE THIRD EXEMPLARY EMBODIMENT

Figure 10:
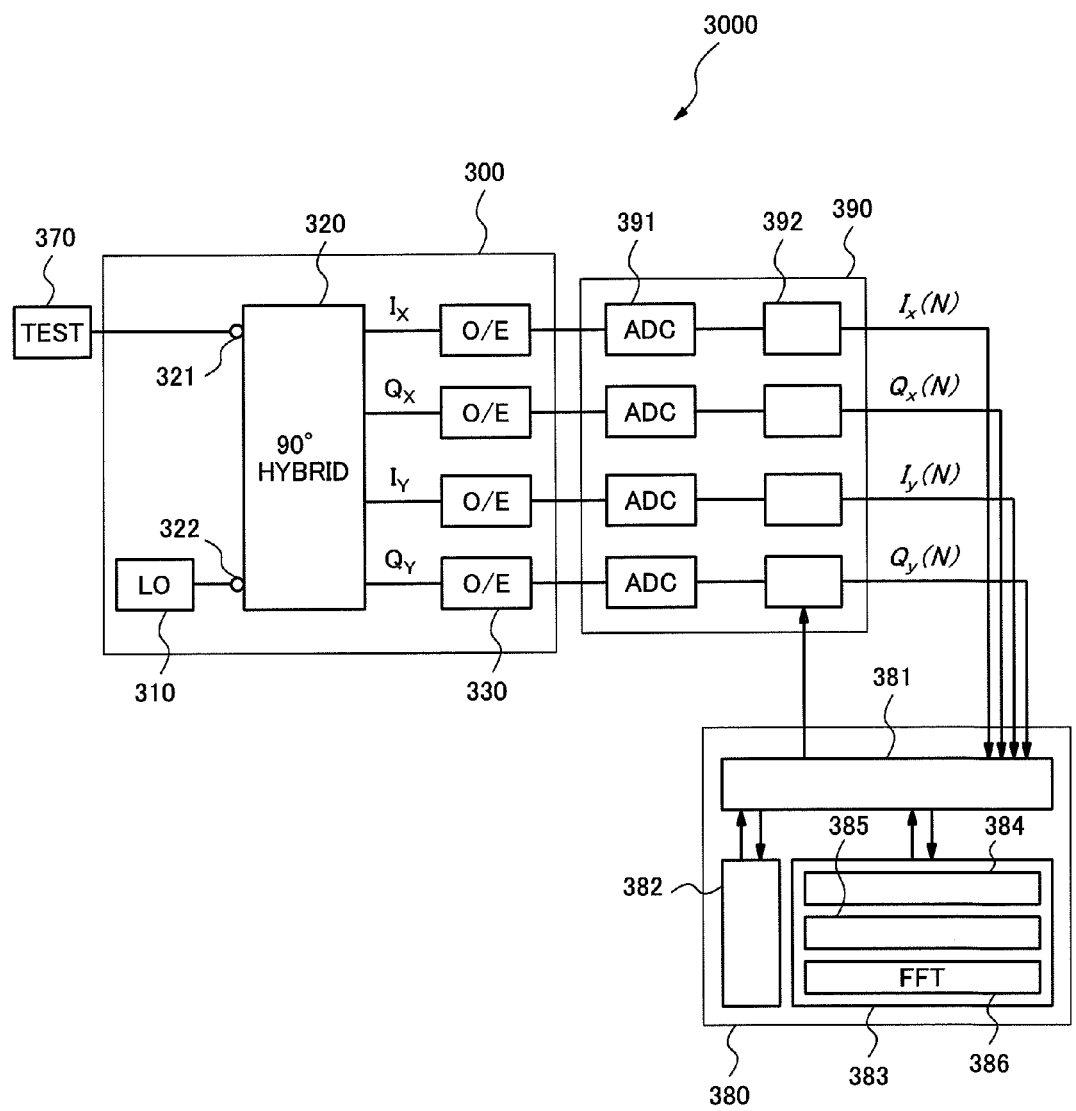
FIG. 10 is a block diagram showing the configuration of an apparatus for detecting inter-channel skew in the coherent optical receiver in accordance with the third exemplary embodiment of the present invention.

Next, the third exemplary embodiment of the present invention will be described. FIG. 10 is a block diagram showing the configuration of an apparatus for detecting inter-channel skew in the coherent optical receiver 3000 in accordance with the third exemplary embodiment of the present invention. The apparatus for detecting inter-channel skew in the coherent optical receiver 3000 has a coherent optical receiver 300, and a test light source 370, a control block 380, and a sampling oscilloscope 390 which are connected to the coherent optical receiver 300

The coherent optical receiver 300 includes a local light source 310, a 90° hybrid circuit (90° HYBRID) 320, and optoelectronic converters (O/E) 330. The control block 380 includes a control unit 381, a memory unit 382, and an operational processing unit 383, where the operational processing unit 383 is provided with a peak detection unit 384, a skew calculation unit 385, and an FFT operation unit (FFT) 386.

In the present exemplary embodiment, the configuration is different from each of the first and the second exemplary embodiments in that it includes the sampling oscilloscope 390 instead of a digital signal processing unit (DSP) and the control block 380 is provided with the FFT operation unit (FFT) 386. The sampling oscilloscope 390 is provided with 4-channel analog to digital converters (ADC) 391 and memory units 392.

The test light source (TEST) 370 is connected to a signal port 321 of the 90° hybrid circuit (90° HYBRID) 320, and the local light source 310 to a local port 322. The beat signals outputted from the output ports of the 90° hybrid circuit (90° HYBRID) 320, that is, $I_X$ port, $Q_X$ port, $I_Y$ port, and $Q_Y$ port, are represented by the above-mentioned formulae from (7) to (10) as is the case in the first exemplary embodiment.

These beat signals are converted into electrical signals by the optoelectronic converters (O/E) 330, quantized by the analog to digital converters (ADC) 391 in the sampling oscilloscope 390, and then waveform data of $I_X(N)$, $Q_X(N)$, $I_Y(N)$, and $Q_Y(N)$ are stored in the memory unit 392. Here, "N" represents the number of the data and takes the values from 0 to 4095, for example.

Figure 11:
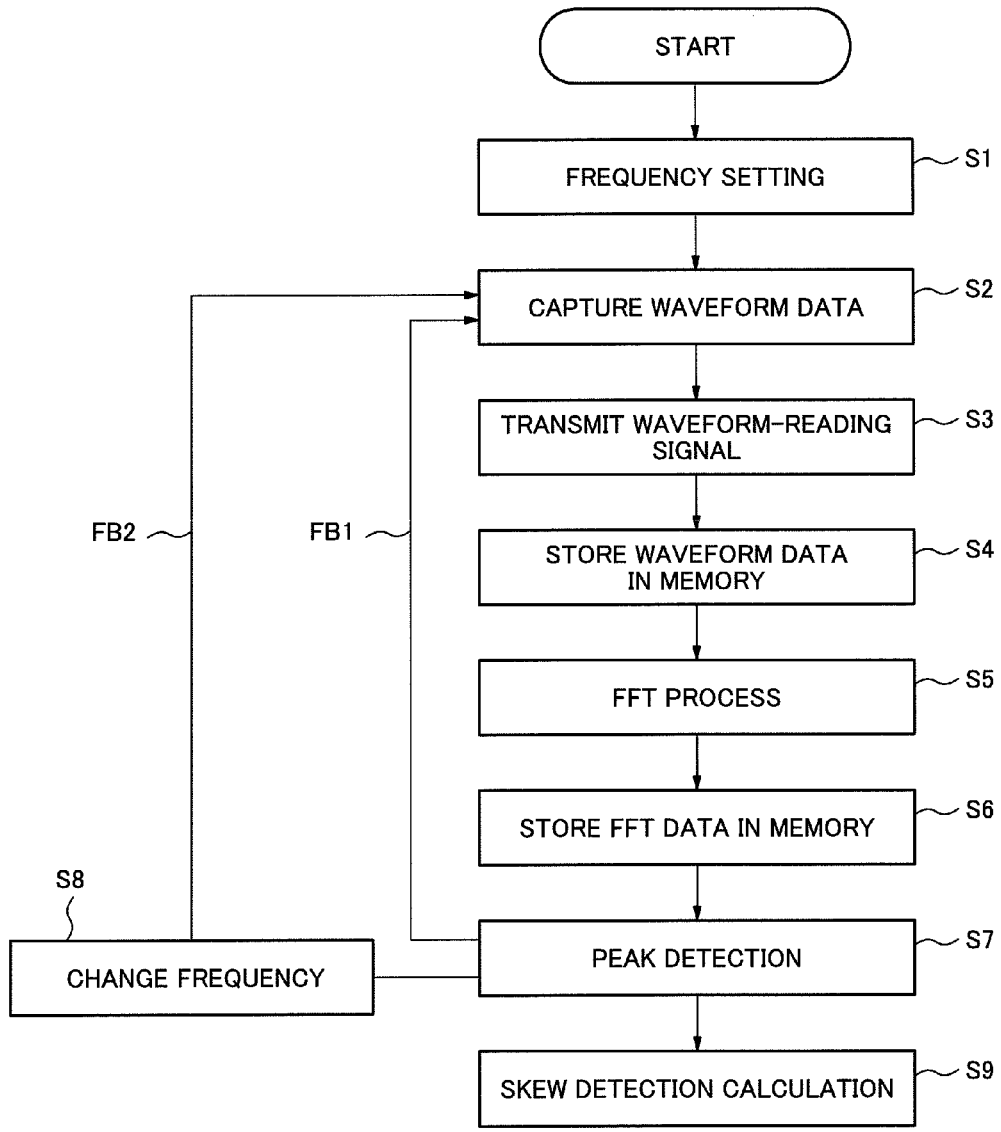
FIG. 11 is a flowchart illustrating a method for detecting inter-channel skew in the coherent optical receiver in accordance with the third exemplary embodiment of the present invention.

Next, referring to a flowchart shown in FIG. 11, the method for detecting inter-channel skew in the coherent optical receiver in accordance with the present exemplary embodiment will be described. First, a frequency of the test light source 370 is set at a frequency $f_{S1}$ (its wavelength is equal to $\lambda_{S1}$) (step S1). Accordingly, a beat signal of a frequency $f_{IF}=|f_{S1}-f_0|$ is outputted from each output port of the 90° hybrid circuit (90° HYBRID) 320.

Next, waveform data is captured in the sampling oscilloscope 390 (step S2). At that time, the control unit 381 in the control block 380 transmits a waveform-reading signal to the sampling oscilloscope 390 (step S3). And then, the waveform data stored at that time in the memory unit 392 in the sampling oscilloscope 390 are stored in the memory unit 382 in the control block 380 (step S4).

The FFT operation unit (FFT) 386 in the control block 380 performs an FFT process on waveform data $I_X(N)$, $Q_X(N)$, $I_Y(N)$, and $Q_Y(N)$ stored in the memory unit 382 (step S5). And then, it returns the processed results of FFT data $I^\wedge_X(N)$, $Q^\wedge_X(N)$, $I^\wedge_Y(N)$, and $Q^\wedge_Y(N)$ to the control unit 381. The control unit 381 stores the acquired FFT data in the memory unit 382 (step S6).

By an instruction from the control unit 381, the peak detection unit 384 in the operational processing unit 383 extracts the data $I^\wedge_X(N_{max})$ having the maximum magnitude from 4096 points of the FFT data $I^\wedge_X(N)$. Then, the frequency $f_{max}$ and the phase $\phi_{max}$ at that point are derived by calculation (step S7).

In order to reduce the influence of a measurement error, the processes from step 2 to step 7 are repeated n times, and frequencies $f_{IX(1,n)}$ and phases $\phi_{IX(1,n)}$ are stored in the memory unit 382, respectively (feedback loop FB1). When the n-th loop has completed, a frequency of the test light source 370 is changed into a frequency $f_{S2}$ (step S8), the processes from step 2 to step 7 are repeated again, and then frequencies $f_{IX(2,n)}$ and phases $\phi_{IX(2,n)}$ are stored in the memory unit 382 (feedback loop FB2). By further sweeping the frequency of the test light source 370 and repeating the feedback loop FB2 m times, frequencies $f_{IX(m,n)}$ and phases $\phi_{IX(m,n)}$ are stored in the memory unit 382, respectively. By performing similar processes for $Q^\wedge_X(N)$, $I^\wedge_Y(N)$, and $Q^\wedge_Y(N)$, frequencies $f_{QX(m,n)}$, $f_{IY(m,n)}$, $f_{QY(m,n)}$, and phases $\phi_{QX(m,n)}$, $\phi_{IY(m,n)}$, and $\phi_{QY(m,n)}$ are stored in the memory unit 382, respectively.

When the above-mentioned processes have completed, by an instruction from the control unit 381, the skew calculation unit 385 in the operational processing unit 383 calculates skews by a similar method to that in the first exemplary embodiment (step S9).

As mentioned above, according to the apparatus and the method for detecting inter-channel skew in the coherent optical receiver of this exemplary embodiment, it becomes possible to calculate skews between the output ports and 90° errors between I port and Q port. Further, by compensating the skew values obtained above in the skew compensation unit of the digital signal processing unit, with which the coherent optical receiver in accordance with the first exemplary embodiment is provided, it becomes possible to demodulate sufficiently even though there arises a skew between the channels, and suppress the degradation of receiving performance.

In the above-mentioned exemplary embodiments, the coherent optical receiver is provided with the polarization diversity type of 90° hybrid circuit. However, the 90° hybrid circuit is not limited to that, a single polarization type of 90° hybrid circuit or its combination can be used.

In addition, although the test light source is connected to the signal port of the 90° hybrid circuit and sweeps frequencies in the above-mentioned exemplary embodiments, but not limited to this, by using a wavelength tunable laser as the local light source, the wavelength of the local light source can be swept with the wavelength of the test light source constant.

THE FOURTH EXEMPLARY EMBODIMENT

Figure 12:
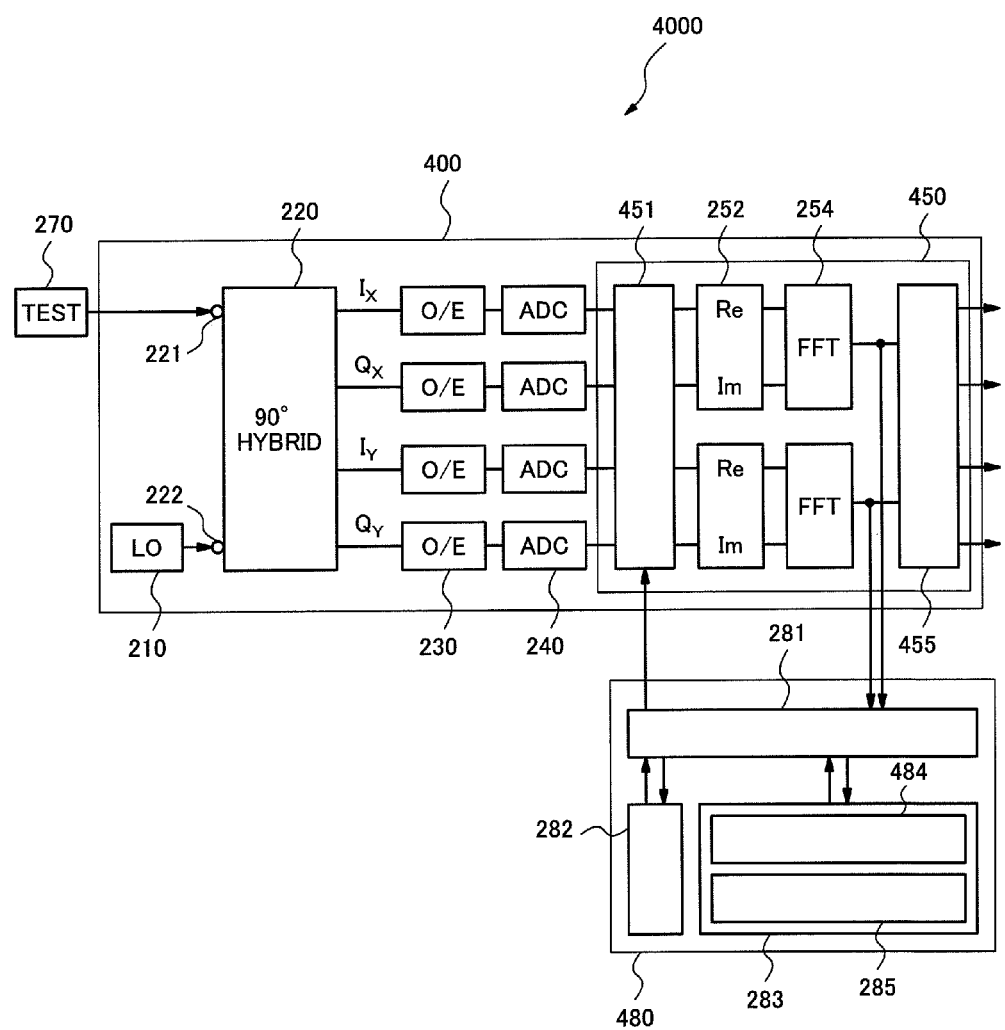
FIG. 12 is a block diagram showing the configuration of an apparatus for detecting inter-channel skew in the coherent optical receiver in accordance with the fourth exemplary embodiment of the present invention.

Next, the fourth exemplary embodiment of the present invention will be described. FIG. 12 is a block diagram showing the configuration of an apparatus for detecting inter-channel skew in the coherent optical receiver 4000 in accordance with the fourth exemplary embodiment of the present invention. The apparatus for detecting inter-channel skew in the coherent optical receiver 4000 has a coherent optical receiver 400, a test light source 270, and a control block 480 connected to the coherent optical receiver 400.

The coherent optical receiver 400 includes a local light source 210, a 90° hybrid circuit (90° HYBRID) 220, optoelectronic converters (O/E) 230, analog to digital converters (ADC) 240, and a digital signal processing unit (DSP) 450. The control block 480 includes a control unit 281, a memory unit 282, and an operational processing unit 283, where the operational processing unit 283 is provided with a multiple peak detection unit 484 and a skew calculation unit 285.

In the coherent optical receiver 400 of the present exemplary embodiment, the configurations of the digital signal processing unit (DSP) 450 and the control block 480 are different from those in the second exemplary embodiment. That is to say, the digital signal processing unit (DSP) 450 includes a skew compensation unit 451 and a signal processing unit 455, and the control block 480 includes the multiple peak detection unit 484. Here, the signal processing unit 455 performs various kinds of signal processing in digital coherent receiving, such as a clock extraction process, a polarization tracking process, and a compensation process for carrier frequency offset. In FIG. 12, the same components, as those of the apparatus for detecting inter-channel skew in the coherent optical receiver 2000 in accordance with the second exemplary embodiment shown in FIG. 8, are represented by the same codes and the descriptions about them are omitted.

In detecting an inter-channel skew in the coherent optical receiver 400, a continuous wave (CW) light as a test light of a frequency $f_S$ (its wavelength is equal to $\lambda_S$) is inputted from the test light source 270 into the signal port 221 as is the case in the second exemplary embodiment. Here, a wavelength tunable light source can be used for the test light source 270. On the other hand, a CW light as a local light of a frequency $f_0$ (its wavelength is equal to $\lambda_0$) is inputted from the local light source 210 into the local port 222. The test light of frequency $f_S$ and the local light of frequency $f_0$ interfere in the 90° hybrid circuit 220, and beat signals of a frequency $f_{IF}=|f_S-f_0|$ are outputted. Here, the beat signals outputted respectively from $I_X$, $Q_X$, $I_Y$, and $Q_Y$ ports are represented by the above-mentioned formulae from (7) to (10) as is the case in the first exemplary embodiment.

These beat signals are converted into electrical signals by the optoelectronic converters (O/E) 230, quantized by the analog to digital converters (ADC) 240, and then inputted into the digital signal processing unit (DSP) 450, respectively. In the digital signal processing unit (DSP) 450, after the difference in propagation delay (skew) is compensated by the skew compensation unit 451, the signals from the I port and the Q port are synthesized, and then processed as complex signals. That is, the complex signal generator 252 receives $I_X$ and $Q_X$, and outputs a complex signal of $E_X=I_X+jQ_X$. Similarly, it receives $I_Y$ and $Q_Y$, and outputs a complex signal of $E_Y=I_Y+jQ_Y$.

In this case, $E_X$ is represented by the following formulae.

$$\cos[\Delta\omega(t-T_1)] + j\sin[\Delta\omega(t-T_2)] =$$

$$\frac{1}{2}(e^{j\Delta\omega(t-T_1)} + e^{-j\Delta\omega(t-T_1)}) + j\frac{1}{2j}(e^{j\Delta\omega(t-T_2)} - e^{-j\Delta\omega(t-T_2)}) =$$

$$\frac{1}{2}[e^{j\Delta\omega t}(e^{-j\Delta\omega T_1} + e^{-j\Delta\omega T_2}) + e^{-j\Delta\omega t}(e^{j\Delta\omega T_1} - e^{j\Delta\omega T_2})] =$$

$$\frac{1}{2}[e^{j\Delta\omega t}P_0 + e^{-j\Delta\omega t}P'_0]$$

where $P_0$, $P'_0$, and $\phi\omega$ are represented by the following formulae.

$$P_0 = e^{-j\Delta\omega T_1} + e^{-j\Delta\omega T_2}$$

$$P'_0 = e^{j\Delta\omega T_1} - e^{j\Delta\omega T_2}$$

$$\Delta\omega = 2\pi f_{IF}$$

where $P_0$ represents the spectral component at the beat frequency $f_{IF}(=\Delta\omega/2\pi)$ when the Fourier transform is performed with a sampling frequency $f_{sample}$, and $P'_0$ represents the spectral component of its mirror image (folding component).

Next, $P_0$ and $P'_0$ are expressed as follows by separating into a real part and an imaginary part, respectively.

$$P_0 = R_0 + jI_0$$

$$P'_0 = R'_0 + jI'_0$$

where $R_0$, $I_0$, $R'_0$, and $I'_0$ are expressed by the following formulae respectively.

$$R_0 = \cos\Delta\omega T_1 + \cos\Delta\omega T_2$$

$$I_0 = -\sin\Delta\omega T_1 - \sin\Delta\omega T_2$$

$$R'_0 = \cos\Delta\omega T_1 - \cos\Delta\omega T_2$$

$$I'_0 = \sin\Delta\omega T_1 - \sin\Delta\omega T_2$$

From the above formulae, the following relational expressions are derived.

$$R_0 + R'_0 = 2\cos\Delta\omega T_1$$

$$R_0 - R'_0 = 2\cos\Delta\omega T_2$$

$$I_0 + I'_0 = -2\sin\Delta\omega T_2$$

$$I_0 + I'_0 = -2\sin\Delta\omega T_1$$

By solving these relational expressions, amounts of propagation delay $T_1$ and $T_2$ are derived as follows.

$$T_1 = \frac{1}{\Delta\omega}\tan^{-1}\left(\frac{-(I_0 - I'_0)}{R_0 + R'_0}\right) \quad (11)$$

$$T_2 = \frac{1}{\Delta\omega}\tan^{-1}\left(\frac{-(I_0 + I'_0)}{R_0 - R'_0}\right)$$

where "$\tan^{-1}$" represents the inverse function of tan (tangent).

The following relational expressions are also derived as another expression.

$$\tan(\Delta\omega T_1) = \frac{-(I_0 - I'_0)}{R_0 + R'_0} = \alpha$$

$$\tan(\Delta\omega T_2) = \frac{-(I_0 + I'_0)}{R_0 - R'_0} = \beta$$

$$\tan\Delta\omega(T_2 - T_1) = \frac{\beta - \alpha}{1 + \alpha\beta}$$

Accordingly, the difference in propagation delay $T_2-T_1$ can be directly derived from $R_0$, $I_0$, $R'_0$, and $I'_0$ by the following relational expression.

$$T_2 - T_1 = \frac{1}{\Delta\omega}\tan^{-1}\left(\frac{\beta - \alpha}{1 + \alpha\beta}\right) \quad (12)$$

According to the above description, it is found possible to derive the difference in propagation delay regarding the beat frequency $f_{IF}$ by using either formula (11) or (12) from spectral components ($R_0$, $I_0$) in Fourier transform signals of the complex signal $E_X$ at the frequency $f_{IF}(=\Delta\omega/2\pi)$ and the component of the mirror image ($R'_0$, $I'_0$) which is a pair to the spectral component.

Figure 13:
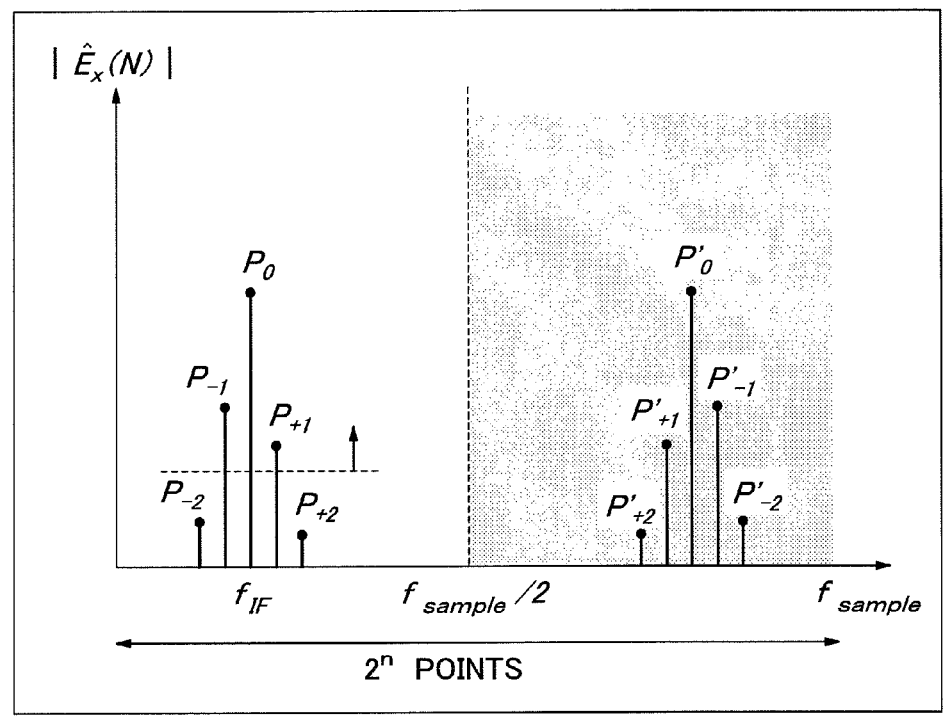
FIG. 13 is a diagrammatic illustration of FFT signal spectra for explaining the operation of an apparatus for detecting inter-channel skew in the coherent optical receiver in accordance with the fourth exemplary embodiment of the present invention.

However, since either formula (11) or (12) is the relational expression derived by performing Fourier transform ideally, an error arises due to the difference from the ideal state if a discrete Fourier transform circuit such as FFT is used. For example, FFT signals shown in FIG. 9 represents the spectra which appear in cases where the beat frequency $f_{IF}$ between the test light and the local light is equal to the k-th grid frequency of FFT, $k \times f_{sample}/2^n$. Here, $2^n$ is the point number of FFT, k is an integer satisfying $0 \leq k \leq 2^n-1$, and n is a positive integer. However, in actual measurements, since the frequency stability of the test light source and the local light source is not sufficient, a beat frequency $f_{IF}$ often deviates from a grid frequency of FFT. In this case, as shown in FIG. 13, the spectrum spreads to adjacent grids of the peak signals in FIG. 9, and a plurality of sidelobe spectra appear. Here, the vertical axis of FIG. 13 represents the magnitude of $\hat{E}_X(N)$, $|\hat{E}_X(N)|$, and the horizontal axis represents the grid frequency of FFT.

When such sidelobes appear, in the apparatus for detecting inter-channel skew in the coherent optical receiver 4000 in accordance with the present exemplary embodiment, the multiple peak detection unit 484 detects a plurality of peak values with a central focus on one of peak values, in which spectral amplitudes of FFT signals have effective values. For example, in FIG. 13, $P_0$ as one of peak values, $P_{-1}$ and $P_{+1}$ with a central focus on $P_0$, and their mirror images $P'_0$, $P'_{-1}$ and $P'_{+1}$ are detected. Here, as the range where spectral amplitudes of FFT signals have effective values, for example, a plurality of peaks having higher-ranking magnitudes of the amplitude level can be selected. Alternatively, with a certain threshold level set in advance, the peaks can be adopted whose amplitude level is equal to or higher than the threshold level. Without limited to this, it is possible to select a combination in which the accuracy of measurements of the difference in propagation delay $T_2-T_1$ is optimized according to measurement conditions.

In the apparatus for detecting inter-channel skew in the coherent optical receiver 4000 in accordance with the present exemplary embodiment, as mentioned above, the multiple peak detection unit 484 detects a plurality of peak values. And then, the difference in propagation delay $T_2-T_1$ is calculated by using either formulae (11) or (12) from each spectral component and the mirror image component which is a pair to the spectral component, and a weighted average proportional to spectral amplitude values is calculated respectively. Accordingly, the accuracy of measurements of the difference in propagation delay $T_2-T_1$ can be improved. For example, in FIG. 13, from $P_0$, $P_{-1}$, and $P_{+1}$ corresponding to the first, second, and third highest peak in the magnitude of the spectral amplitude and their mirror images of $P'_0$, $P'_{-1}$, and $P'_{+1}$, the differences in propagation delay $\Delta T_0$, $\Delta T_{-1}$, and $\Delta T_{+1}$ are calculated respectively. Here, as the difference in propagation delay $T_2$31 $T_1$, a weighted average of them is used. That is to say, the difference in propagation delay $T_2-T_1$ is calculated by the following formula.

$$T_2-T_1 = (|P_{-1}|\Delta T_{-1} + |P_0|\Delta T_0 + |P_{-1}|\Delta T_-)/(|P_{-1}| + |P_0| + |P_{+1}|)$$

Further, if the number of adopted peaks is increased to m, the difference in propagation delay $T_2-T_1$ can be similarly calculated by the following formula.

$$T_2-T_1 = (|P_0|\Delta T_0 + \ldots + |P_m|\Delta T_m)/(|P_0| + \ldots + |P_m|)$$

Figure 14:
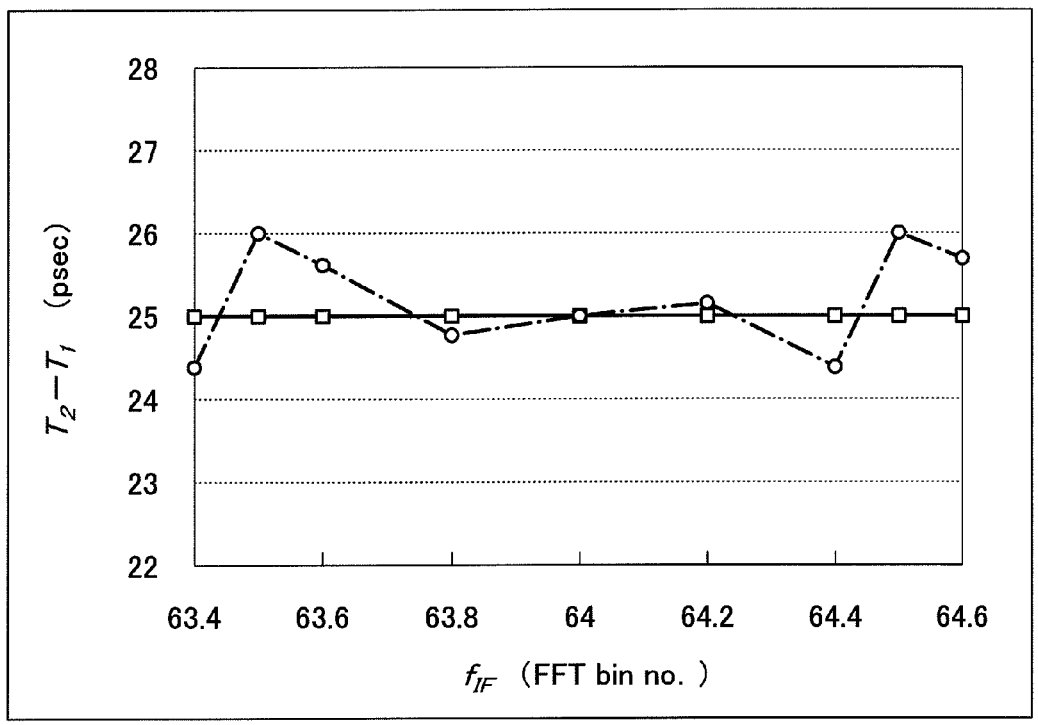
FIG. 14 is a diagram showing simulation results produced by application of an apparatus for detecting inter-channel skew in the coherent optical receiver in accordance with the fourth exemplary embodiment of the present invention.

In FIG. 14, the results of a simulation are shown in which the apparatus for detecting inter-channel skew in the coherent optical receiver 4000 in accordance with the present exemplary embodiment is applied to the case where sidelobes appear in a spectrum of FFT signals. In the figure, the results of a simulation are shown for a case where adding an amount of propagation delay $T_2-T_1 = 25$ psec, an FFT circuit is used which has the number of FFT points of 4096 and a sampling rate of 64 GS/s (Giga samples per second). The vertical axis of FIG. 14 represents the amount of propagation delay $T_2-T_1$, and the horizontal axis represents the beat frequency $f_{IF}$ expressed in a unit of the grid interval of FFT frequency. In the conditions of the present simulation, the unit of the grid interval of FFT frequency is equal to 64 GS/s/4096, and $f_{IF}$ corresponds to an FFT grid frequency of 1 GHz ($=64 \times 64$ GS/s/4096) when the number of the grid interval of FFT frequency (FFT bin. no.) is equal to an integer number of 64.

As will be noted from FIG. 14, when the difference in propagation delay $T_2-T_1$ is calculated by using only a single peak $P_0$ and its mirror image $P'_0$ shown in FIG. 13 (symbol "◯" in FIG. 14), an error of up to ±1 psec approximately arises providing that $f_{IF}$ deviates from 64 (integer value). In contrast, when the difference in propagation delay $T_2-T_1$ is calculated by using a weighted average of a plurality of amplitude values (symbol "☐" in FIG. 14), it is noted that the measurement with an error of almost zero becomes possible even if $f_{IF}$ deviates from 64.

Here, $P_0$ and $P_{-1}$ (or $P_{+1}$) corresponding to the first and second largest peaks in amplitude values in FIG. 13 and their respective mirror images of $P'_0$ and (or $P'_{+1}$), are used. A skew detection can be also performed by a similar method using a discrete Fourier transform (DFT) instead of FFT. In this case, positive integers can be used as the number of points shown in FIG. 13 not limited to powers of 2 (2″).

In this way, according to the apparatus for detecting inter-channel skew in the coherent optical receiver 4000 in accordance with the present exemplary embodiment, the multiple peak detection unit 484 detects a plurality of peak values and calculates the difference in propagation delay from the spectrum for each peak, respectively. Then, by calculating a weighted average proportional to the spectral amplitude values, the accuracy of measurements of the difference in propagation delay can be improved.

As mentioned above, according to the apparatus and the method for detecting inter-channel skew in the coherent optical receiver of this exemplary embodiment, it becomes possible to calculate the difference in propagation delay (skew) between the output ports with a higher degree of accuracy. Further, the amount of propagation delay (skew value) obtained above are compensated in the skew compensation unit 451 of the digital signal processing unit 450, with which the coherent optical receiver 400 is provided. By this way, it becomes possible to demodulate sufficiently even though the difference in propagation delay (skew) arises between the channels, and suppress the degradation of receiving performance.

THE FIFTH EXEMPLARY EMBODIMENT

Figure 15:
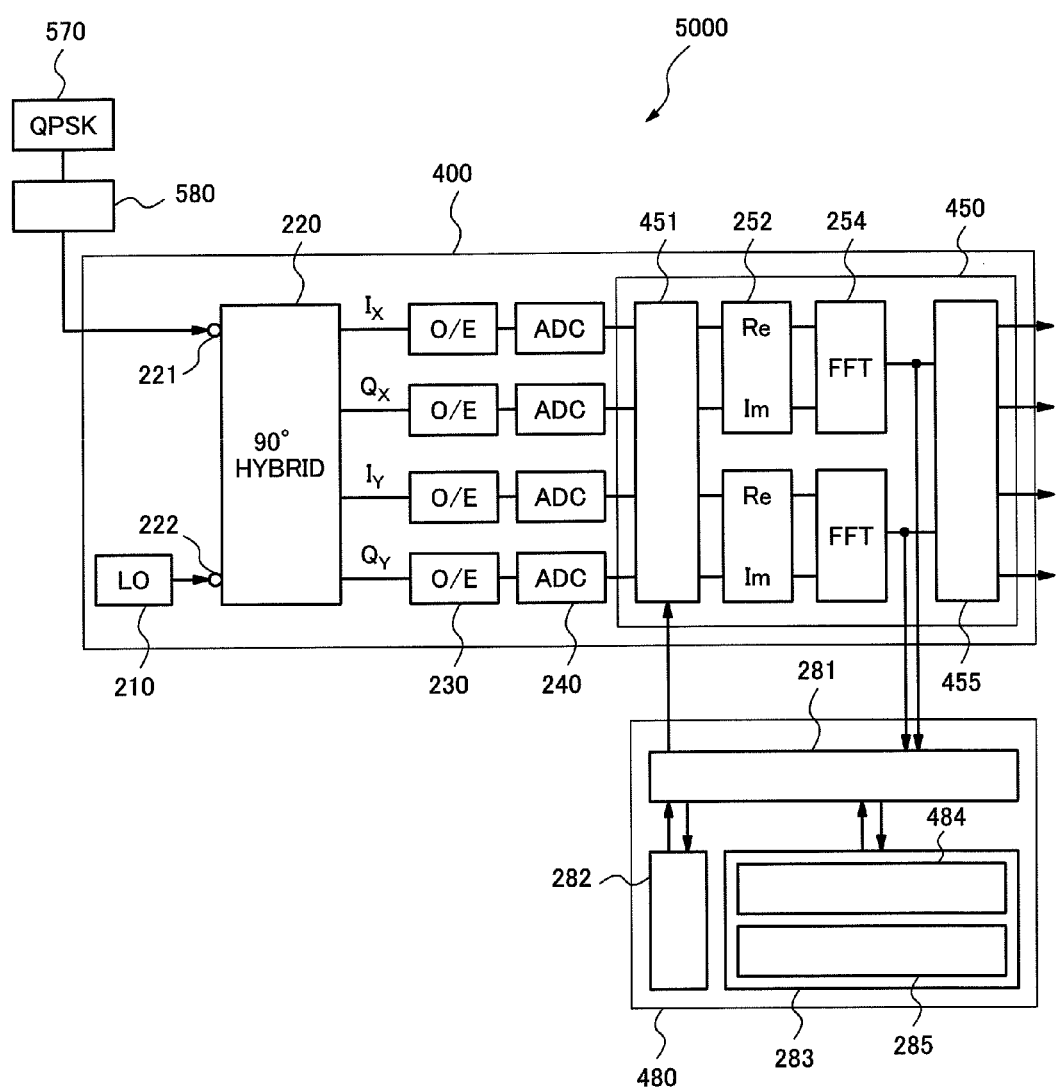
FIG. 15 is a block diagram showing the configuration of an apparatus for detecting inter-channel skew in the coherent optical receiver in accordance with the fifth exemplary embodiment of the present invention.

Next, the fifth exemplary embodiment of the present invention will be described. FIG. 15 is a block diagram showing the configuration of an apparatus for detecting inter-channel skew in the coherent optical receiver 5000 in accordance with the fifth exemplary embodiment of the present invention. The apparatus for detecting inter-channel skew in the coherent optical receiver 5000 is different from the apparatus for detecting inter-channel skew in the coherent optical receiver 4000 in accordance with the fourth exemplary embodiment in that it includes a phase-modulation light source 570 as the test light source 270 and further includes a polarization controller 580. In FIG. 15, the same components, as those of the apparatus for detecting inter-channel skew in the coherent optical receiver 4000 shown in FIG. 12, are represented by the same codes and the descriptions about them are omitted.

Figure 16:
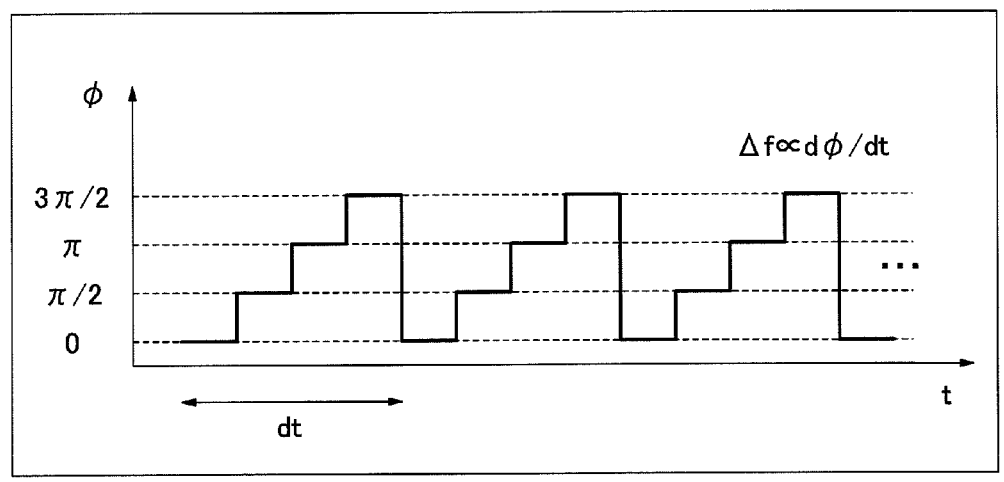
FIG. 16 is an output waveform chart of a phase modulation light source in the apparatus for detecting inter-channel skew in the coherent optical receiver in accordance with the fifth exemplary embodiment of the present invention.

The phase-modulation light source 570 transmits a modulated light as a test light, for example, a modulated light modulated by phase modulation with the four levels (0, π/2, π, and 3π/2), that is, a quadrature phase-shift keying (QPSK). In FIG. 16, as an example of an output waveform of the phase-modulation light source 570, the waveform of a modulated light is shown which is produced by repeating a phase modulation with a saw-toothed phase-shift. The vertical axis represents the phase (φ) of the light signal, and the horizontal axis represents the time (t). Those modulated lights generate a frequency shift corresponding to $\Delta\omega = 2\pi f = d\phi/dt$ (digital serrodyne modulation), where φ represents a phase of the light signal. Accordingly, the phase-modulation light source 570 is able to control the frequency shift Δω very stably and with a high degree of accuracy by changing a period of the saw-toothed phase modulation. As a result, it is unnecessary to use a wavelength tunable light source emitting CW light with unstable frequency as the test light source 270, though it is used in the apparatus for detecting inter-channel skew in the coherent optical receiver 2000, 4000 according to the second or the fourth exemplary embodiments. Accordingly, it is possible to detect a skew with a higher degree of accuracy.

The polarization controller 580 sets a polarization angle for approximate 45° (or an angle corresponding to 45°) if the test light transmitted from the phase-modulation light source 570 has a single polarization. And it adjusts the polarization state so that the light power outputted from $I_X$, $Q_{X,IY}$, and $Q_Y$ ports will be made equal approximately. Accordingly, in cases where the signals transmitted from the phase-modulation light source 570 undergo polarization scrambling or polarization multiplexing (for example, DP-QPSK modulation and so on), it is possible to detect a skew even though the polarization controller 580 is not used.

In the apparatus for detecting inter-channel skew in the coherent optical receiver 5000 in accordance with the present exemplary embodiment, skew detection is performed by a technique similar to that in the second or the fourth exemplary embodiment by using the above-mentioned test light with its frequency stable and controllable with a high degree of accuracy. As a result, it becomes possible to detect a skew with a higher degree of accuracy. And then, the skew values detected above are compensated in the skew compensation unit of the digital signal processing unit, with which the coherent optical receiver is provided. By this way, it becomes possible to demodulate sufficiently even though a skew arises between the channels, and suppress the degradation of receiving performance.

In the present exemplary embodiment, the case has been described as an example where the phase-modulation light source 570 transmits the modulated light generated by QPSK modulation as a test light. However, not limited to that, it is obvious that the present exemplary embodiment is applicable to the cases where the phase-modulation light source 570 transmits the modulated light generated by other phase-modulation schemes such as QAM (Quadrature Amplitude Modulation) or analog serrodyne modulation.

THE SIXTH EXEMPLARY EMBODIMENT

Figure 17:
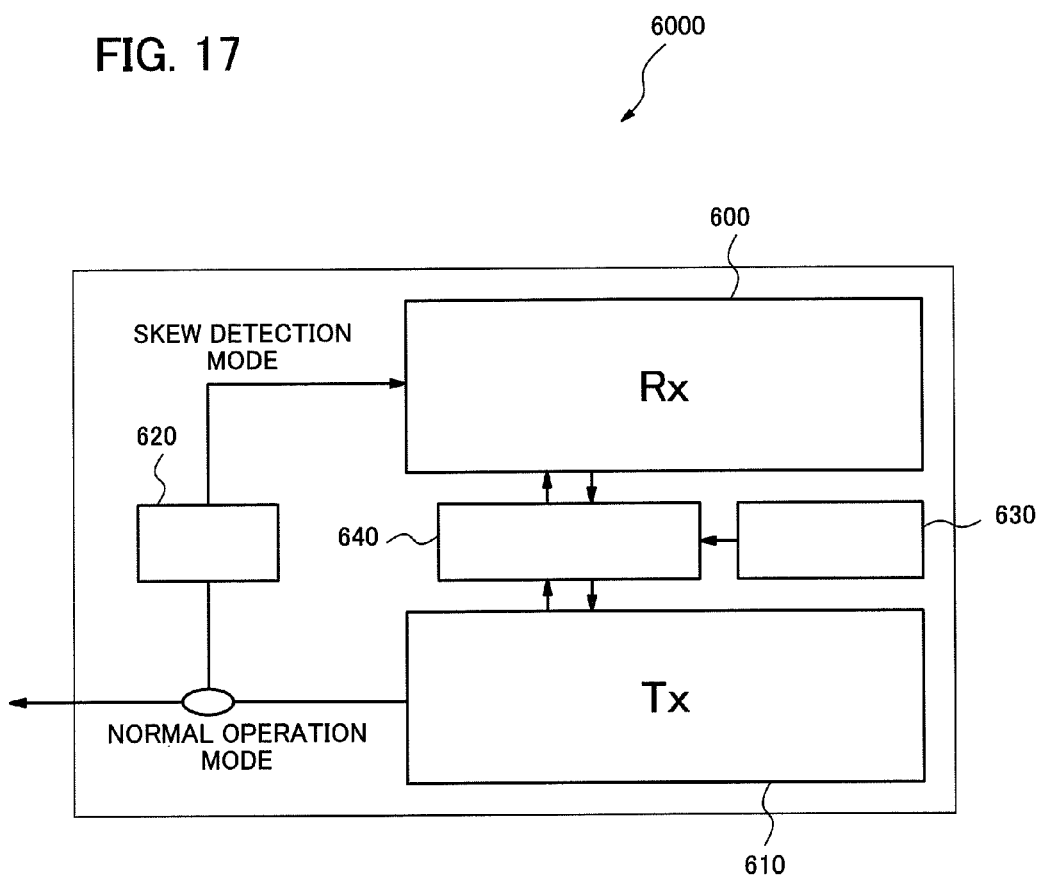
FIG. 17 is a block diagram showing the configuration of an optical transceiver in accordance with the sixth exemplary embodiment of the present invention.
Figure 18:
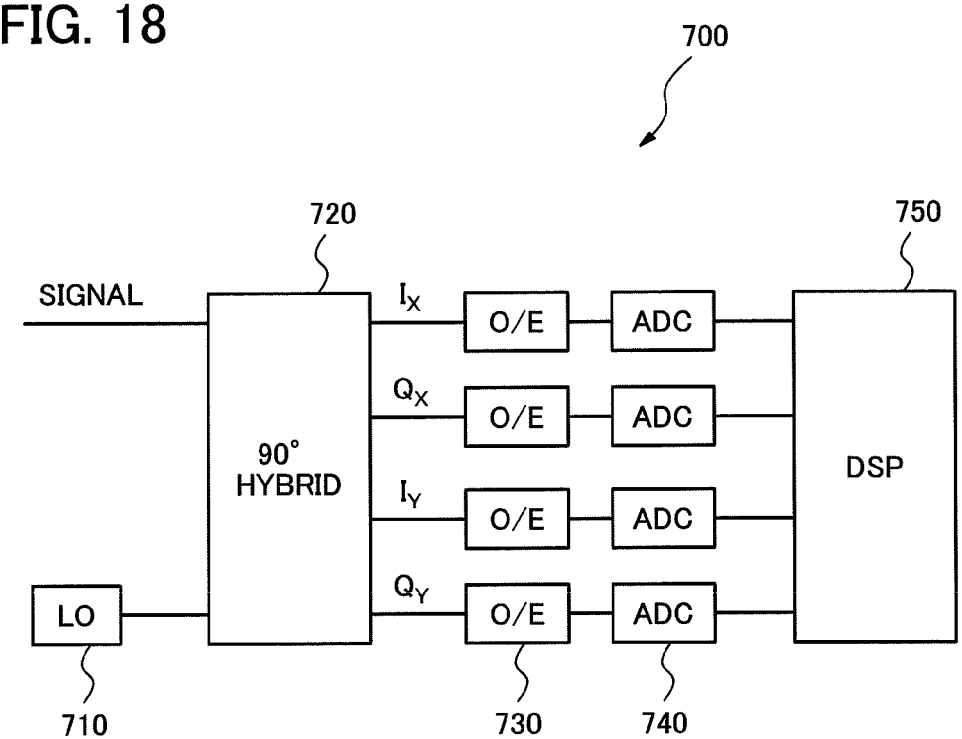
FIG. 18 is a block diagram showing the configuration of a related coherent optical receiver.
Figure 19:
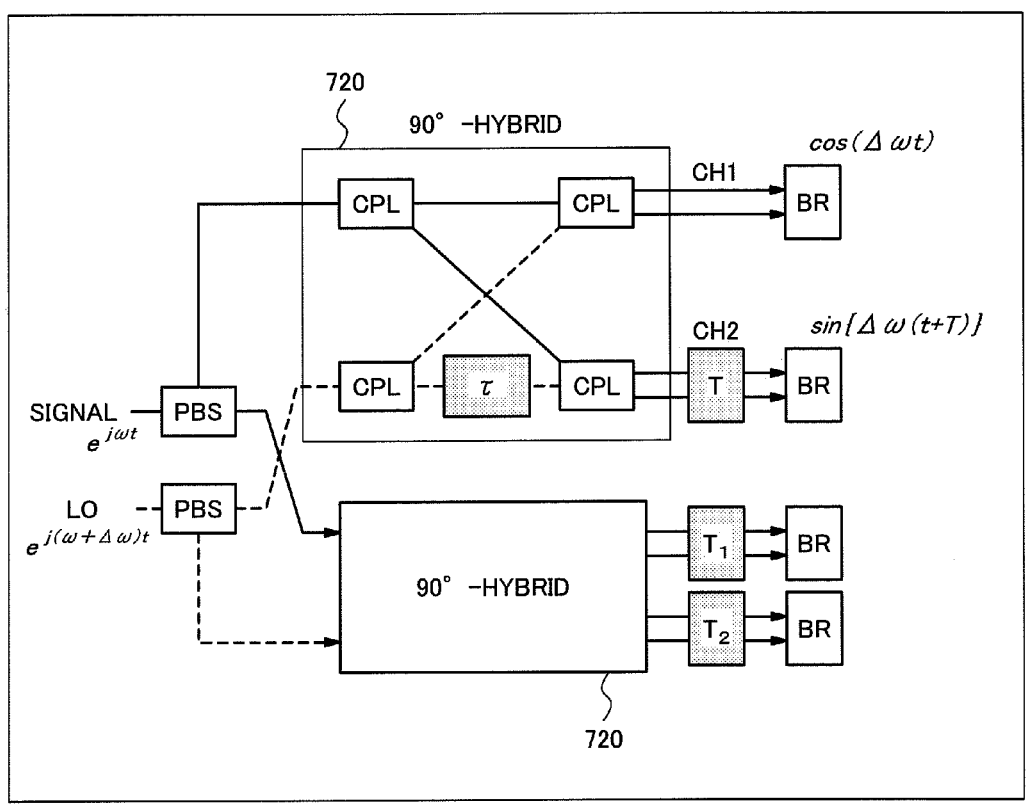
FIG. 19 is a block diagram showing the configuration of related 90° hybrid circuits and their peripherals.

Next, the sixth exemplary embodiment of the present invention will be described. FIG. 17 is a block diagram showing the configuration of an optical transmitter/receiver 6000 in accordance with the sixth exemplary embodiment of the present invention. The optical transmitter/receiver 6000 includes a coherent optical receiver (Rx) 600, an optical transmitter (Tx) 610, a polarization controller 620, a mode switching device 630, and a control unit 640. In the optical transmitter/receiver 6000 in accordance with the present exemplary embodiment, the optical transmitter 610 is provided with a phase modulator such as a QPSK modulator. As the phase modulator, it is possible to use a modulator similar to the phase-modulation light source 570, with which the apparatus for detecting inter-channel skew in the coherent optical receiver in accordance with the fifth exemplary embodiment is provided.

The mode switching device 630 instructs the control unit 640 to switch between the skew detection mode of detecting an inter-channel skew and the normal operation mode of performing normal communication activity in an inspection process of the optical transmitter/receiver 6000 at the time of its manufacture and so on.

In the skew detection mode, the control unit 640 controls the optical transmitter 610 so that the optical transmitter 610 will transmit the transmission light with a saw-toothed phase-modulated waveform. This saw-toothed phase-modulated waveform can be made the waveform similar to that transmitted by the phase-modulation light source 570 in the apparatus for detecting inter-channel skew in the coherent optical receiver 5000 in accordance with the fifth exemplary embodiment (FIG. 16). Further, the control unit 640 controls the coherent optical receiver 600 so that the coherent optical receiver 600 will perform the process for detecting the inter-channel skew in the apparatus for detecting inter-channel skew in the coherent optical receiver 5000 in accordance with the fifth exemplary embodiment. At that time, the control unit 640 controls the coherent optical receiver 600 to use the transmission light from the optical transmitter 610 as a test light.

Here, the polarization controller 620 adjusts a polarization state of the test light transmitted from the optical transmitter 610 so that the light power outputted from $I_X$, $Q_X$, $I_Y$, and $Q_Y$ ports in the coherent optical receiver 600 will be made equal approximately. Accordingly, in cases where the signals transmitted from the optical transmitter 610 undergo polarization scrambling or polarization multiplexing (for example, DP-QPSK modulation and so on), it is possible to detect a skew even though the polarization controller 620 is not used.

On the other hand, in the normal operation mode, the control unit 640 controls the optical transmitter 610 so that normal optical transmission signals will be transmitted from the optical transmitter 610.

In this way, the optical transmitter 610 of the optical transmitter/receiver 6000 can be used as a light source for transmitting phase-modulated test light. This enables the optical transmitter/receiver, including the apparatus for detecting inter-channel skew in the coherent optical receiver 5000 in accordance with the fifth exemplary embodiment, to have a simpler configuration. Therefore, according to the present exemplary embodiment, it is possible to obtain a small optical transmitter/receiver which can detect a skew between the ports in a coherent optical receiver with a high degree of accuracy.

The present invention is not limited to the above-mentioned exemplary embodiments and can be variously modified within the scope of the invention described in the claims. It goes without saying that these modifications are also included in the scope of the invention.

This application is based upon and claims the benefit of priority from Japanese patent application No. 2011-019612, filed on Feb. 1, 2011, the disclosure of which is incorporated herein in its entirety by reference.

DESCRIPTION OF THE CODES 100, 200, 300, 400 coherent optical receiver
110, 210, 310 local light source
120, 220, 320 90° hybrid circuit (90° HYBRID)
121, 221, 321 signal port
122, 222, 322 local port
130, 230, 330 optoelectronic converter (O/E)
140, 240 analog to digital converter (ADC)
150, 250, 450 digital signal processing unit (DSP)
151, 451 skew compensation unit
152 demodulation unit
153, 253 buffer unit (BUF)
154, 254, 386 FFT operation unit (FFT)
170, 270, 370 test light source
180, 280, 380, 480 control block
181, 281, 381 control unit
182, 282, 382, 392 memory unit
183, 283, 383 operational processing unit
184, 284, 384 peak detection unit
185, 285, 385 skew calculation unit
252 complex signal generator
390 sampling oscilloscope
455 signal processing unit
484 multiple peak detection unit
570 phase-modulated light source
580, 620 polarization controller
600 coherent optical receiver (Rx)
610 optical transmitter (Tx)
630 mode switching device
640 control unit
700 related coherent optical receiver
710 local light source
720 90° hybrid circuit (90° HYBRID)
730 optoelectronic converter (O/E)
740 analog to digital converter (ADC)
750 digital signal processing unit (DSP)
1000, 2000, 3000, 4000, 5000 apparatus for detecting inter-channel skew in the coherent optical receiver
6000 optical transmitter/receiver.

The invention claimed is:

1. A method for detecting inter-channel skew in a coherent optical receiver, comprising the steps of:
   outputting a plurality of optical signals separated into a plurality of signal components by making a test light from a test light source interfere with a local light from a local light source;
   detecting the optical signals and outputting detected electrical signals;
   quantizing the detected electrical signals and outputting quantized signals;
   performing a fast Fourier transform process on the quantized signals; and
   calculating a difference in propagation delay between the plurality of signal components on the basis of a plurality of peak values in the results of performing the fast Fourier transform process.

2. The method for detecting inter-channel skew in a coherent optical receiver according to claim 1, wherein,
   in the step of calculating the difference in propagation delay, detecting peak values whose amplitude values are equal to or larger than a predetermined value as the plurality of peak values,
   calculating a peak frequency and a peak phase at each of the peak values with respect to each of the plurality of signal components; and
   calculating the difference in propagation delay by obtaining a weighted average for each difference in propagation delay respectively calculated by the peak frequency and the peak phase, wherein the weighted average is proportional to amplitude value of each of the plurality of peak values.

3. The method for detecting inter-channel skew in a coherent optical receiver according to claim 2, wherein,
   in the step of calculating the difference in propagation delay, calculating the difference in propagation delay from the peak frequency and the peak phase at one of the peak values and its mirror image component in the results of performing the fast Fourier transform process.

* * * * *

UNITED STATES PATENT AND TRADEMARK OFFICE
CERTIFICATE OF CORRECTION

PATENT NO. : 8,953,953 B2
APPLICATION NO. : 14/082875
DATED : February 10, 2015
INVENTOR(S) : Junichi Abe et al.

It is certified that error appears in the above-identified patent and that said Letters Patent is hereby corrected as shown below:

IN THE SPECIFICATION

Column 7, Line 12: Delete "$I_X=\cos(2\pi F_{IF}t+\phi_{IX})$," and insert

--$I_X=\cos(2\pi f_{IF}t+\phi_{IX})$--

$$Q_X=\sin(2\pi F_{IF}t+\phi_{QX})$$

$$I_Y=\cos(2\pi F_{IF}t+\phi_{IY})$$

Column 7, Line 13 thru Column 7, Line 17: Delete "$Q_Y=\cos(2\pi F_{IF}t+\phi_{QX})$," and insert $Q_X=\sin(2\pi f_{IF}t+\phi_{QX})$ $I_Y=\cos(2\pi f_{IF}t+\phi_{IY})$ --$Q_Y=\sin(2\pi f_{IF}t+\phi_{QY})$--

Signed and Sealed this
Fifth Day of January, 2016

Michelle K. Lee
*Director of the United States Patent and Trademark Office*

IN THE SPECIFICATION $$R_1+R_2=2\cos\Delta\omega t_1$$

$$R_1-R_2=2\cos\Delta\omega t_2$$

$$I_1+I_2=-2\sin\Delta\omega t_2$$

Column 12, Line 53 thru Column 12, Line 59: Delete "$I_1+I_2=-2\sin\Delta\omega t_1$" and insert $$R_1 + R_2 = 2\cos\Delta\omega T_1$$
$$R_1 - R_2 = 2\cos\Delta\omega T_2$$
$$I_1 + I_2 = -2\sin\Delta\omega T_2$$
$$I_1 - I_2 = -2\sin\Delta\omega T_1$$